(12) United States Patent
Hyodo et al.

(10) Patent No.: US 6,327,867 B1
(45) Date of Patent: Dec. 11, 2001

(54) REFRIGERATOR HAVING A COOLER MOUNTED IN EACH OF A REFRIGERATOR COMPARTMENT AND A FREEZER COMPARTMENT

(75) Inventors: Akira Hyodo, Ikoma; Yoshito Kimura, Hirakatsu; Hiroki Hamano, Izumiotsu; Hiroshi Yamada, Koka-gun; Haruhiko Iwai, Yasu-gun; Makoto Fujihashi, Otsu, all of (JP)

(73) Assignee: Matsushita Refrigeration Company, Osaka (JP)

( * ) Notice: Subject to any disclaimer, the term of this patent is extended or adjusted under 35 U.S.C. 154(b) by 0 days.

(21) Appl. No.: 09/622,622
(22) PCT Filed: Feb. 17, 1999
(86) PCT No.: PCT/JP99/00682
§ 371 Date: Aug. 18, 2000
§ 102(e) Date: Aug. 18, 2000
(87) PCT Pub. No.: WO99/42770
PCT Pub. Date: Aug. 26, 1999

(30) Foreign Application Priority Data

Feb. 20, 1998 (JP) .................................................. 10-038405
Feb. 23, 1998 (JP) .................................................. 10-039949

(51) Int. Cl.$^7$ .................................................. F25D 17/04
(52) U.S. Cl. ............................................. 62/187; 62/441
(58) Field of Search ........................... 62/187, 407, 441, 62/408, 203, 231

(56) References Cited

U.S. PATENT DOCUMENTS

| | | | |
|---|---|---|---|
| 4,543,799 | * | 10/1985 | Horvay et al. ........................... 62/441 |
| 5,157,941 | * | 10/1992 | Cur et al. ................................. 62/441 |
| 5,388,427 | * | 2/1995 | Lee ........................................... 62/441 |
| 5,424,210 | * | 6/1995 | Bae et al. ................................. 62/441 |
| 5,664,437 | * | 9/1997 | Park et al. ............................... 62/407 |
| 5,737,939 | * | 4/1998 | Valence et al. ......................... 62/441 |
| 5,758,512 | * | 6/1998 | Peterson et al. ........................ 62/441 |
| 5,870,900 | * | 2/1999 | Mohebbi et al. ....................... 62/187 |
| 5,896,753 | * | 4/1999 | Kwak et al. ............................. 62/441 |
| 5,918,479 | * | 7/1999 | Ji et al. .................................... 62/408 |

\* cited by examiner

Primary Examiner—Teresa Walberg
Assistant Examiner—Fadi H. Dahbour
(74) Attorney, Agent, or Firm—Wenderoth, Lind & Ponack, L.L.P.

(57) ABSTRACT

A refrigerator has a refrigerator compartment, a freezer compartment, and a low-temperature storage chamber formed in the refrigerator compartment and having a temperature lower than that of the refrigerator compartment. The refrigerator includes a compressor, a condenser, a first throttling device, a channel control valve, a refrigerator cooling unit, and a freezer cooling unit connected in series to form a refrigerating cycle. The refrigerator cooling unit and the freezer cooling unit are accommodated in the refrigerator compartment and the freezer compartment, respectively. The refrigerator also includes a second throttling device connected in parallel with the refrigerator cooling unit, a first air fan for sending cold air heat-exchanged by the refrigerator cooling unit to the refrigerator compartment, a second air fan for sending cold air heat-exchanged by the freezer cooling unit to the freezer compartment, a suction duct for introducing air inside the refrigerator compartment to the refrigerator cooling unit, a discharge duct for introducing air cooled by the refrigerator cooling unit into the refrigerator compartment and into the low-temperature storage chamber, and an electrically-operated damper accommodated in the discharge damper. When the electrically-operated damper is opened, an amount of air to be introduced into the low-temperature storage chamber is greater than an amount of air to be introduced into the refrigerator compartment.

19 Claims, 21 Drawing Sheets

REFRIGERATOR HAVING A COOLER MOUNTED IN EACH OF A REFRIGERATOR COMPARTMENT AND A FREEZER COMPARTMENT

TECHNICAL FIELD

The present invention relates to a refrigerator having a cooler mounted in each of a refrigerator compartment and a freezer compartment and, more particularly, to a refrigerator capable of improving the cooling performance and reliability of a cooling system for the independent cooling of a freezer compartment and a refrigerator compartment.

BACKGROUND ART

Japanese Laid-Open Patent Publication (unexamined) No. 8-240373 discloses a conventional refrigerator as shown in FIG. 1, which includes a refrigerator body 1 having a refrigerator compartment 2 and a freezer compartment 3 both defined therein for storing foods. The refrigerator compartment 2 and the freezer compartment 3 are partitioned by a generally horizontally extending medial wall member 30 and are opened and closed by doors 4 and 5, respectively, hingedly mounted on a front surface of the refrigerator body 1.

A freezer cooling unit 8 is disposed on the rear side of the freezer compartment 3 for cooling air drawn from the freezer compartment 3 using the latent heat of evaporation of refrigerant. An air fan 7 connected to a rotary shaft of a fan motor 31 is disposed above the freezer cooling unit 8 for circulating into the freezer compartment 3 cold air heat-exchanged by the freezer cooling unit 8.

A plurality of shelves 32, on which foods are placed, are accommodated within the refrigerator compartment 2 to partition it into a plurality of small compartments. A low-temperature storage chamber 33, in which specific foods are stored at a specific temperature range, is defined at an upper portion of the refrigerator compartment 2, while a vegetable storage chamber or crisper 6 is defined at a lower portion of the refrigerator compartment 2. A compressor 11 is disposed in a machine chamber positioned below the vegetable storage chamber 6.

A cold air discharging means 34 is provided on the rear side of the refrigerator compartment 2, while a duct member 36 having cold air outlets 35 defined therein is provided on the rear side of the low-temperature storage chamber 33. A refrigerator cooling unit 10 is disposed on the rear side of the duct member 36 for heat-exchanging air drawn through an air passage 37, while an air fan 9 connected to a rotary shaft of a fan motor 39 is disposed above the refrigerator cooling unit 10 so that the air drawn through the air passage 37 may be heat-exchanged by the refrigerator cooling unit 10 and introduced into the refrigerator compartment 2 and the low-temperature storage chamber 33 through cold air outlets 38 and through the cold air outlets 35, respectively.

The cold air discharging means 34 communicates at an upper portion thereof with a lower portion of the duct member 36 and extends downwardly to a rear portion of the vegetable storage chamber 6.

In the above-described conventional construction, however, the temperature within the low-temperature storage chamber 33 depends on the distribution ratio of air discharged from the cold air outlets 35 and 38. Accordingly, when the heat load in the refrigerator compartment 2 is low, for example, when the temperature of the open air is low, the working efficiency of the air fan 9 becomes low, making it impossible to cool the low-temperature storage chamber 33 down to a set temperature. Furthermore, if the low-temperature storage chamber 33 is cooled down to the set temperature, the temperature within the refrigerator compartment 2 becomes lower than a set temperature, thus causing a problem of having to heat the refrigerator compartment 2 by the use of, for example, a heater.

In addition, even after the air fan 9 has stopped upon completion of the cooling of the refrigerator compartment 2, the cooling of the freezer compartment 3 continues and, hence, air in the proximity of the refrigerator cooling unit 10 is cooled by a refrigerant flowing through the refrigerator cooling unit 10. Because the cooled air flows downwardly from the refrigerator cooling unit 10 by convection, the cold air flows from the cold air outlets 38 into a lower portion of the refrigerator compartment 2, thus causing a problem of lowering the temperature of the lower portion of the refrigerator compartment 2 below a set temperature.

Japanese Utility Model Publication (examined) No. 58-35979 discloses another conventional refrigerator employing a refrigerating cycle as shown in FIG. 2.

In FIG. 2, 41 is a compressor, 42 a condenser, 43 a first capillary serving as a means to reduce pressure, 44 a first evaporator for cooling a refrigerator compartment, 45 a second evaporator for cooling a freezer compartment, and 46 a channel control valve. 47 is a second (bypass) capillary connecting a flow-dividing portion 48 positioned between the first capillary 43 and the channel control valve 46 with a flow-merging portion 49 positioned between the first evaporator 44 and the second evaporator 45. 50 is a third capillary provided between the channel control valve 46 and the first evaporator 44.

Thus, the refrigerating cycle is repeatedly started and stopped in order to cool a freezer compartment and a refrigerator compartment (not shown) and to maintain them at comparatively low temperatures.

During the operation of the refrigerating cycle, a refrigerant compressed by the compressor 41 is condensed and liquefied in the condenser 42. When the channel control valve 46 is opened, the condensed refrigerant, whose pressure is lowered by the first capillary 43, reaches the flow-dividing portion 48 in a medium-pressure state. The refrigerant is then divided at the flow-dividing portion 48 to flow through the second capillary 47 and the third capillary 50.

Part of the refrigerant is reduced in pressure by the third capillary 50, vaporized or gasified by the first evaporator 44 and the second evaporator 45, and reabsorbed by the compressor 41. The other part is reduced in pressure by the second capillary 47, merged at the flow-merging portion 49, and vaporized or gasified by the second evaporator 45.

The third capillary 50 has a much lower resistance than does the second capillary 47 and, hence, most of the refrigerant passes through the third capillary 50 when the channel control valve 46 is open.

In addition, when the channel control valve 46 is in a closed state, the condensed refrigerant is reduced in pressure by the first capillary 43 and the second capillary 47, vaporized or gasified by the second evaporator 45, and absorbed by the compressor 41.

The interior of the refrigerator is cooled by heat exchange with the evaporators whose temperature is lower in comparison with the temperature inside the refrigerator.

In such a refrigerator, however, the refrigerant whose pressure has been lowered by the first capillary 43 during the opening of the channel control valve 46 is temporarily expanded when divided at the flow-dividing portion 48, and is then readmitted into the comparatively narrow capillaries.

The refrigerant at the flow-dividing portion 48 is a two-phase refrigerant composed of a gas and a liquid. Because the refrigerator experiences wide-ranging load variations due to changes in the temperature of outside air, the opening and closing of the door, the introduction and removal of food products, and the like, the flow rate in the capillaries also varies, changing the dryness of the refrigerant at the flow-dividing portion 48.

Because the flow rate in a capillary decreases when the gas phase of the refrigerant enters an inlet portion thereof, the flow rate of the third capillary 50, which normally allows essentially all of the refrigerant to pass through, sometimes decreases and the flow rate through the second capillary 47 increases when a difference in resistance arises between the second capillary 47 and the third capillary 50; for example, when one of them is filled with a liquid and the other is in a state in which a gas enters the inlet portion. The same applies to the transitional period of opening or closing the channel control valve 46 due to the changes in the inlet state of the capillaries.

A disadvantage is that due to such flow rate variations, the flow rate of the refrigerant through the first evaporator 44, which is used for the cooling of the refrigerator compartment, is insufficient when such cooling is needed, and the refrigerator compartment is not cooled properly.

Another disadvantage is that because the heat capacity from the flow-dividing portion 48 to the channel control valve 46 is comparatively high, these portions are heated by the ambient temperature when the compressor 41 is stopped, dryness is enhanced during operation, the flow rate into the comparatively narrow capillaries decreases, and the cooling performance is adversely affected.

In addition, the medium pressure of the flow-dividing portion 48 is set high in comparison with the vaporization pressure of the evaporator in order to reduce the frosting of the channel control valve 46, so the third capillary 50 must have a predetermined resistance value (resistance value close to the first capillary 43), and the second capillary 47 must have an even higher resistance value in order to divide the flow when the channel control valve 46 is open. Furthermore, the total resistance value of the capillaries is such that a series connection is established between the first capillary 43 and the second capillary 47 when the channel control valve 46 is closed, and a combination of a series connection with the first capillary 43 and a parallel connection between the third capillary 50 and the second capillary 47 is formed when the channel control valve 46 is opened.

Since resistance is lower for a parallel connection than for each individual element, the difference in the overall resistance of the refrigerating cycle between the open and closed states of the channel control valve 46 is extremely large. The reduced-pressure resistance of the refrigerating cycle is therefore optimized only when the channel control valve 46 is open or closed, resulting in lower system efficiency.

Yet another drawback is that the cooling system circuits can be switched by opening and closing the channel control valve 46, but when a switch over is made from a circuit that passes through the first evaporator 44 for the cooling of the refrigerator compartment to a circuit that creates a bypass through the second evaporator 45 for the cooling of the freezer compartment, the refrigerant present in the first evaporator 44 moves into the second evaporator 45, and if the arrangement is such that the first evaporator 44 is disposed below the second evaporator 45, or the line-pass pattern of the first evaporator 44 has a structure in which a liquid trap is formed (for example, a structure whose pass pattern is such that a plurality of rows or tube runs go from top to bottom and then back to the top), the refrigerant is propelled as a result of vaporization and condensation rather than being propelled directly in the liquid state, so a comparatively long time elapses and the machine oil tends to stay in the first evaporator, necessitating an increase in the amount of sealed machine oil.

Another feature is that, for example, a top-freezer refrigerator is configured such that the first evaporator is disposed below the second evaporator, but because the refrigerant and the machine oil present in the first evaporator when the channel control valve is closed have difficulty returning to the second evaporator in the top position and tend to stay in the first evaporator due to the effect of gravity, the system tends to operate with an insufficient amount of refrigerant or machine oil following valve switching, creating drawbacks in terms of cooling performance or compressor reliability.

A drawback, therefore, is that a gas deficit is created during the switching of the channel control valve 46, or the refrigerant must be sealed in a larger amount, leading to increased electric consumption and higher costs.

Still another drawback is that the cooling system must be welded in a larger number of locations, and costs are increased as a result of increased labor requirements.

The present invention has been developed to overcome the above-described disadvantages.

It is accordingly an objective of the present invention to provide an improved refrigerator capable of properly regulating the temperature within a low-temperature storage chamber independently of load variations and preventing a refrigerator compartment from reducing in temperature below a set value.

Another objective of the present invention is to provide a refrigerator having an enhanced cooling performance.

Yet another objective of the present invention is to provide a refrigerator having optimally designed pressure reduction means and a more effective cooling system.

Still another objective of the present invention is to provide a refrigerator capable of reducing a gas deficit during the switching of a channel control valve and rendering the cooling system more effective.

A further objective of the present invention is to provide a low-cost refrigerator for which less labor is needed to assemble the cooling system.

DISCLOSURE OF THE INVENTION

In accomplishing the above and other objectives, a refrigerator according to the present invention has a refrigerator compartment and a freezer compartment both defined therein, wherein the refrigerator compartment has a low-temperature storage chamber of a temperature lower than that of the refrigerator compartment. The refrigerator includes a compressor, a condenser, a first throttling device, a channel control valve, a refrigerator cooling unit, and a freezer cooling unit connected in series to form a refrigerating cycle. The refrigerator cooling unit and the freezer cooling unit are accommodated in the refrigerator compartment and the freezer compartment, respectively. The refrigerator also includes a second throttling device connected in parallel with the refrigerator cooling unit, a first air fan for sending cold air heat-exchanged by the refrigerator cooling unit to the refrigerator compartment, a second air fan for sending cold air heat-exchanged by the freezer cooling unit to the freezer compartment, a suction duct for introducing air inside the refrigerator compartment to the refrigerator cooling unit, a discharge duct for introducing air cooled by the refrigerator cooling unit into the refrigerator compartment and into the low-temperature storage chamber, and an electrically-operated damper accommodated in the discharge damper. When the electrically-operated damper is open, an amount of air to be introduced into the low-temperature storage chamber is greater than an amount of air to be introduced into the refrigerator compartment, making it possible to cool the low-temperature chamber more quickly than the refrigerator compartment and to appropriately regulate the temperature within the low-temperature compartment independently of load variations.

The first air fan preferably has a varying capacity and can be operated at one of a first speed and a second speed higher than the first speed. When the low-temperature storage chamber is cooled, the first air fan is operated at the first speed to send a reduced amount of air to the refrigerator cooling unit. Accordingly, the temperature of air introduced into the low-temperature storage chamber becomes low, enhancing the cooling efficiency for the low-temperature storage chamber.

The compressor may likewise have a varying capacity and can be operated at one of a first speed and a second speed higher than the first speed. In this case, when the low-temperature storage chamber is cooled, the compressor is operated at the second speed to lower the temperature of evaporation in the refrigerator cooling unit, thereby lowering the temperature of air heat-exchanged by the refrigerator cooling unit. As a result, the temperature of air introduced into the low-temperature storage chamber becomes low, enhancing the cooling efficiency for the low-temperature storage chamber.

The refrigerator preferably includes a timer, a first temperature detector for detecting the temperature within the refrigerator compartment, and a second temperature detector for detecting the temperature within the low-temperature storage chamber.

By this construction, when the temperature detected by the first temperature detector is higher than a set temperature of the refrigerator compartment and when the temperature detected by the second temperature detector is higher than a set temperature of the low-temperature storage chamber, operation of the first air fan is started, and the electrically-operated damper is opened after a lapse of time recorded by the timer.

Upon cooling of the refrigerator compartment and after the temperature of air heat-exchanged by the refrigerator cooling unit has been lowered, the cooling of the low-temperature storage chamber is started, making it possible to narrow the width of temperature variations in the low-temperature storage chamber.

Alternatively, when the temperature detected by the first temperature detector becomes lower than a set temperature of the refrigerator compartment and when the temperature detected by the second temperature detector becomes lower than a set temperature of the low-temperature storage chamber, the channel control valve is closed and operation of the first air fan is stopped after a lapse of time recorded by the timer.

By this construction, After the channel control valve has been closed, the refrigerant present in the refrigerator cooling unit evaporates immediately, and cold air is uniformly drawn into the refrigerator compartment through discharge ports, thus preventing a lower portion of the refrigerator compartment from reducing in temperature below a set temperature.

The channel control valve may be opened simultaneously with a stop of the compressor, and the first air fan is operated for a predetermined period of time. By so doing, even if the refrigerant flows into the refrigerator cooling unit, it evaporates immediately, and cold air is uniformly drawn into the refrigerator compartment through the discharge ports, thus preventing a lower portion of the refrigerator compartment from reducing in temperature below a set temperature.

Alternatively, when the temperature detected by the first temperature detector is higher than a set temperature of the refrigerator compartment and when the temperature detected by the second temperature detector is higher than a set temperature of the low-temperature storage chamber, the channel control valve is opened and operation of the first air fan is started after a lapse of predetermined time.

Because the cooling is started after the temperature of the refrigerator cooling unit has been sufficiently lowered, the interior of the low-temperature storage chamber is cooled with low-temperature cold air immediately after the start of cooling of the low-temperature storage compartment, enhancing the cooling efficiency for the low-temperature storage chamber.

Advantageously, the refrigerator includes a heater accommodated in the discharge duct. The heater is supplied with electricity, when the temperature detected by the first temperature detector becomes a set temperature of the refrigerator compartment before the temperature detected by the second temperature detector becomes a set temperature of the low-temperature storage chamber.

By this construction, even if the cooling load in the refrigerator compartment is low, for example, when the temperature of the open air is low, or even if the cooling load in the low-temperature storage chamber becomes high when foods have been stored therein, only air in the discharge duct is heated, avoiding a temperature drop below the set temperature in the refrigerator compartment, while cooling the low-temperature storage chamber down to the set temperature.

A plurality of illumination lamps accommodated in the discharge duct may be substituted for the heater, resulting in a reduction in the manufacturing cost.

In another form of the present invention, a refrigerator includes a compressor, a condenser, a first pressure reduction means, a channel control valve, a first evaporator accommodated in the refrigerator compartment, and a second evaporator accommodated in the freezer compartment, all of which are connected in series to form a refrigerating cycle. The refrigerator also includes a bypass conduit having a second pressure reduction means for connecting a flow-dividing portion positioned between the first pressure reduction means and the channel control valve, and a flow-merging portion positioned between the first evaporator and the second evaporator, wherein a pressure reduction of the first pressure reduction means is greater than that of the second pressure reduction means.

According to the above structure, the flow rate to the first evaporator does not change with the refrigerant state because it is possible to avoid situations in which the refrigerant is throttled for the second time in the comparatively narrow line after passing through the first pressure reduction means when the channel control valve is open.

In addition, the resistance value of the second pressure reduction means is set higher than the combined resistance value of the flow rate control valve and the first evaporator (the resistance value of the flow rate control valve and the evaporator is commonly very low), so the refrigerant proceeds into the first evaporator with virtually no resistance.

Cooling performance can thus be enhanced without creating any shortage in terms of the cooling of the refrigerator compartment or the flow rate of the refrigerant entering the first evaporator for refrigeration cooling when such refrigeration cooling is required.

Also, the cooling performance is not reduced in any way because the manner in which the flow is divided does not change when the state of the refrigerant is changed by the heat effects demonstrated in the vicinity of the channel control valve.

Furthermore, the resistance value of the second pressure reduction means should be set above the very low combined resistance value of the flow rate control valve and the first evaporator to prevent the pressure reduction from varying widely due to the opening and closing of the channel control valve. The reduced-pressure resistance of the refrigerating cycle can thus be optimized, and system efficiency increased.

Conveniently, heat is exchanged between a pipe connecting the second evaporator and the compressor, and the first pressure reduction means, whereby the line connected to the compressor is heated to prevent frosting, to enhance the cooling effect of the refrigerating cycle, and to improve the cooling performance.

Again conveniently, heat is exchanged between the first pressure reduction means and a pipe connecting the first evaporator and the second evaporator, enhancing the cooling effect of the refrigerating cycle and providing better cooling performance.

When the freezer compartment is positioned below the refrigerator compartment, it is preferred that the first evaporator be disposed above the second evaporator and have a pass pattern in which a plurality of tube runs are sequentially arranged in a single direction from top of the first evaporator downward, thereby preventing liquid traps from forming. In this case, the refrigerant present in the first evaporator is smoothly transported to the second evaporator by the pressure difference and gravity when a switching is made by the opening or closing of the channel control valve from a circuit that passes through the first evaporator for refrigerator cooling to a circuit that creates a bypass through the second evaporator for freezer cooling.

The efficiency of the cooling system can therefore be enhanced by avoiding a situation in which a significant gas deficit is produced in the second evaporator during the switching of the channel control valve or the amount of sealed refrigerant must be increased.

Advantageously, the first evaporator is of a fin-coil-type one disposed near a cold air circulation means and has a plurality of tube runs, of which neighboring tube runs are shifted from each other by a predetermined pitch to form a staggered layout, allowing the fin coil to occupy a wider projected area in a cross section perpendicular to the direction of air flow without forming liquid traps in the first evaporator. In addition, the heat-transfer coefficient can be increased by the enhanced turbulence around the tube runs, and the efficiency of the cooling system can be increased.

Again advantageously, the flow-dividing portion, the second pressure reduction means, and the flow-merging portion are disposed in the refrigerator compartment, whereby the number of welded connections in the freezer compartment is minimized (reduced to two) by employing a simple structure in which the second evaporator is merely connected with the inlet and outlet lines.

Work is thus facilitated in the comparatively inaccessible second evaporator below the first evaporator.

In addition, the first evaporator, channel control valve, second pressure reduction means, flow-dividing portion, and flow-merging portion can be integrated into a single unit, allowing this sub-assembled unit to be incorporated into the system itself merely by performing welding at two locations. It is also possible to cut down on labor and to improve welding reliability.

In yet another form of the present invention, a refrigerator has a refrigerator compartment, a freezer compartment, and a machine chamber all defined therein, wherein the refrigerator compartment is formed above the freezer compartment, and the machine chamber is formed at a lower portion of the freezer compartment. The refrigerator includes a first cold air circulation means and a first evaporator both located on a surface deep inside the refrigerator compartment, and a second cold air circulation means and a second evaporator both located on a surface deep inside the freezer compartment, with the second evaporator disposed below the first evaporator.

With this arrangement, the refrigerant or machine oil inside the first evaporator gradually returns to the second evaporator in the direction of gravity when the supply of refrigerant to the first evaporator is stopped by the switching of the channel control valve. A smooth return of the refrigerant is thus facilitated, and it is unlikely that the refrigerant stays in the first evaporator, preventing the cooling performance or reliability from being adversely affected while avoiding situations in which the system operates with a shortage of the refrigerant or machine oil.

Alternatively, the machine chamber is formed at a lower portion of the freezer compartment, while the second cold air circulation means and the second evaporator are located at another lower portion of the freezer compartment in front of the machine chamber, whereby the interior of the freezer compartment can be used freely as a storage space, and the difficult-to-use portion of the bottom of the refrigerator body can be used as a space for accommodating the machine chamber and the second evaporator, making it possible to configure the inactive capacity in a more efficient manner.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on application Nos. 10-38405 and 10-39949 filed in Japan on Feb. 20 and 23, 1998, respectively, the content of which is incorporated hereinto by reference.

Figure 1:
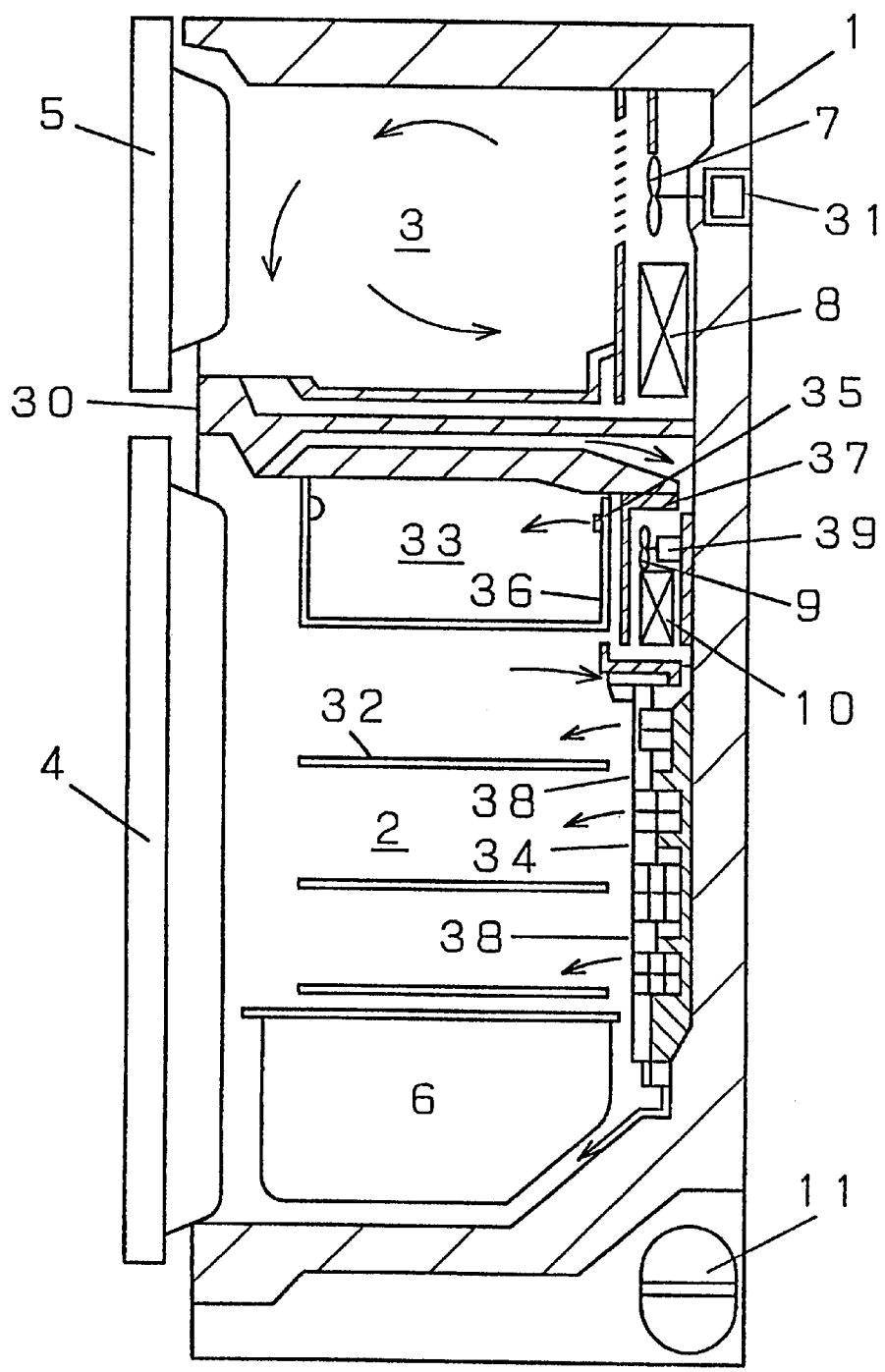
FIG. 1 is a vertical sectional view of a conventional refrigerator.
Figure 2:
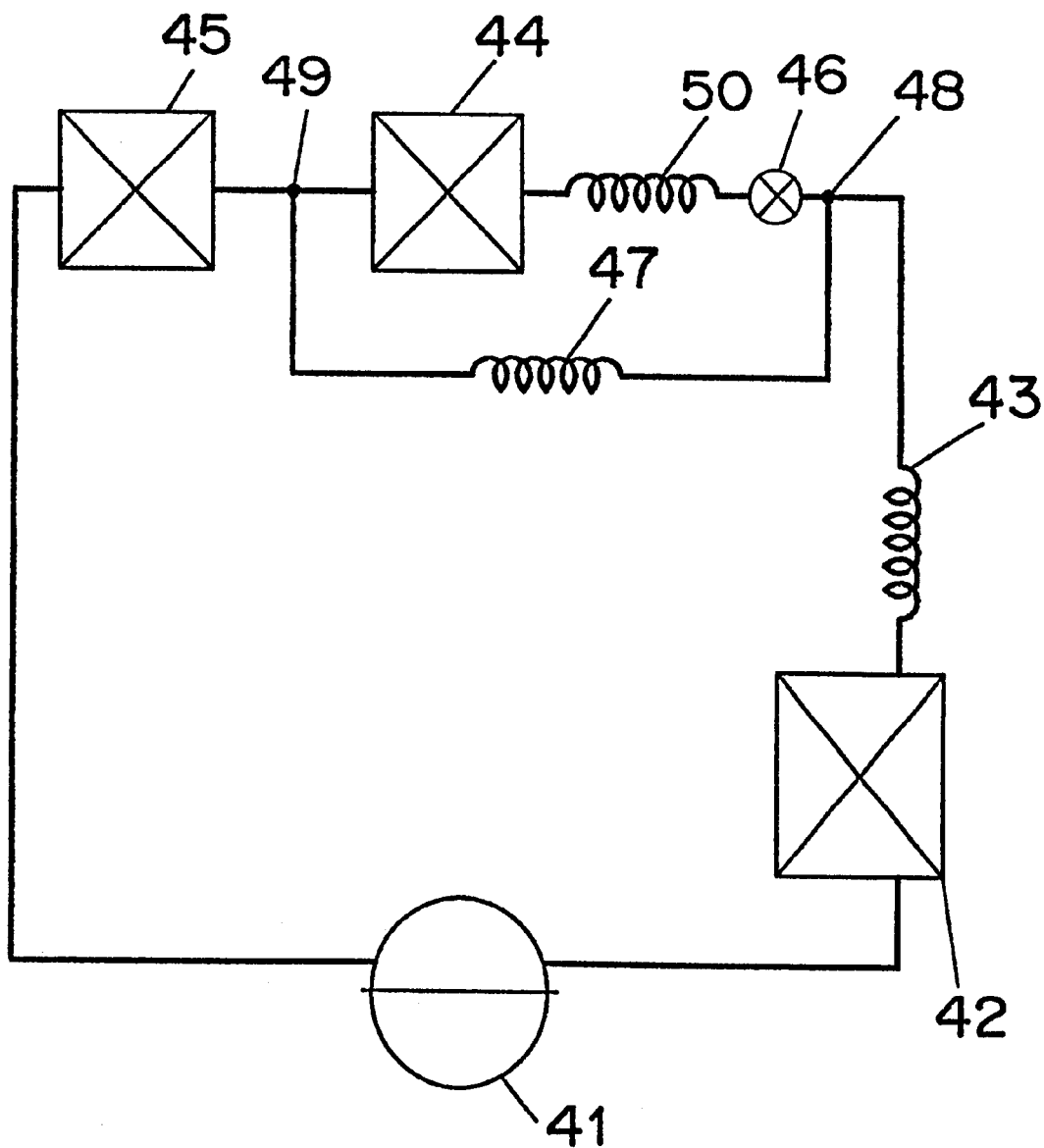
FIG. 2 is a block diagram of a refrigerating cycle employed in another conventional refrigerator.
Figure 3:
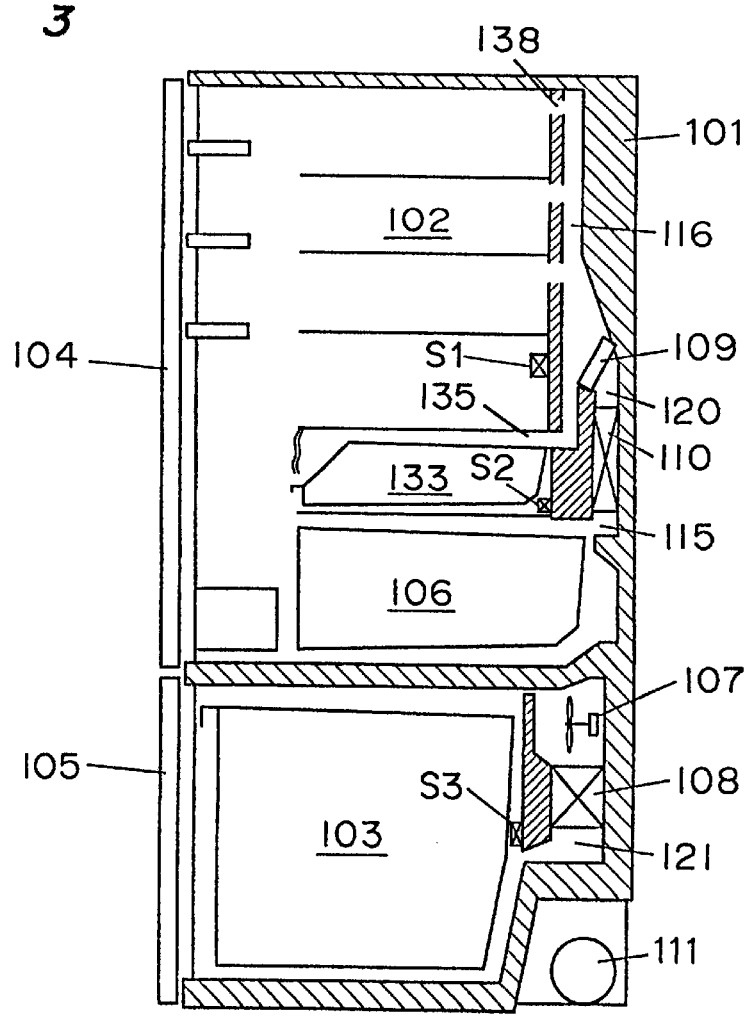
FIG. 3 is a vertical sectional view of a first embodiment of a refrigerator according to the present invention.

Referring now to the drawings, there is shown in FIG. 3 a bottom-freezer refrigerator embodying the present invention, which includes a refrigerator body 101 having a cold storage or refrigerator compartment 102 and a freezer compartment 103 both defined therein at upper and lower portions thereof, respectively. The refrigerator compartment 102 and the freezer compartment 103 are opened and closed by doors 104 and 105, respectively, hingedly mounted on a front surface of the refrigerator body 101.

A cooler chamber 121 is formed at a rear portion of the freezer compartment 103 and accommodates a freezer cooling unit 108 for producing cold air and an air fan 107 for sending the cold air.

The refrigerator compartment 102 is partitioned by partition plates into a plurality of small compartments, in which foods are stored. A vegetable storage chamber or crisper 106, in which vegetables are mainly stored, is formed at a lower portion of the refrigerator compartment 102, while a low-temperature storage chamber 133 is formed above the vegetable storage chamber 106. The temperature within the low-temperature storage chamber 133 is generally set to a value lower than the temperature within the refrigerator compartment 102 and that within the vegetable storage chamber 106. By way of example, the temperature within the refrigerator compartment 102 is set in the range of 2° C. to 4° C., while that within the low-temperature storage chamber 133 is set in the range of −4° C. to −2° C. The temperature within the freezer compartment 103 is set in the range of −21° C. to −17° C.

A temperature sensor S1 for detecting the temperature within the refrigerator compartment 102 is provided at a rear portion of the refrigerator compartment 102, while a temperature sensor S2 for detecting the temperature within the low-temperature storage chamber 133 is provided at a rear portion of the low-temperature storage chamber 133. A temperature sensor S3 for detecting the temperature within the freezer compartment 103 is provided at a rear portion of the freezer compartment 103.

A cooler chamber 120 is formed at a rear portion of the refrigerator compartment 102 and accommodates a refrigerator cooling unit 110 for producing cold air, an air fan 109 for sending the cold air, a suction duct 115 for introducing the air inside the refrigerator compartment 102 to the refrigerator cooling unit 110, and a discharge duct 116 for introducing the air heat-exchanged and cooled by the refrigerator cooling unit 110 into the refrigerator compartment 102.

Figure 4:
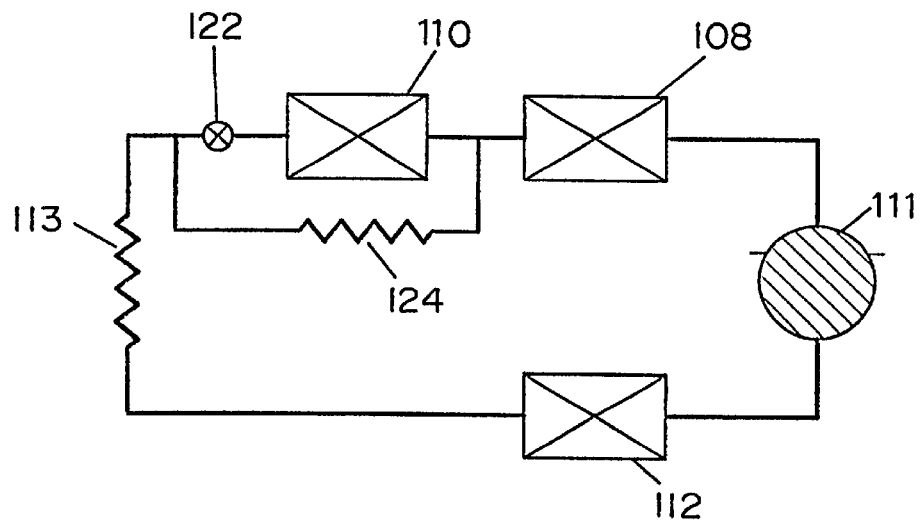
FIG. 4 is a block diagram of a refrigerating cycle employed in the refrigerator of FIG. 3.

FIG. 4 depicts a refrigerating cycle employed in the refrigerator of FIG. 3. As shown therein, the refrigerating cycle is formed by connecting a compressor 111, a condenser 112, a first throttling device 113, a channel switching or channel control valve 122, the refrigerator cooling unit 110, and the freezer cooling unit 108 in series in this order and by connecting a second throttling device 124 in parallel with the refrigerator cooling unit 110. The channel control valve 122 controls a flow of refrigerant into the refrigerator cooling unit 110.

Figure 5:
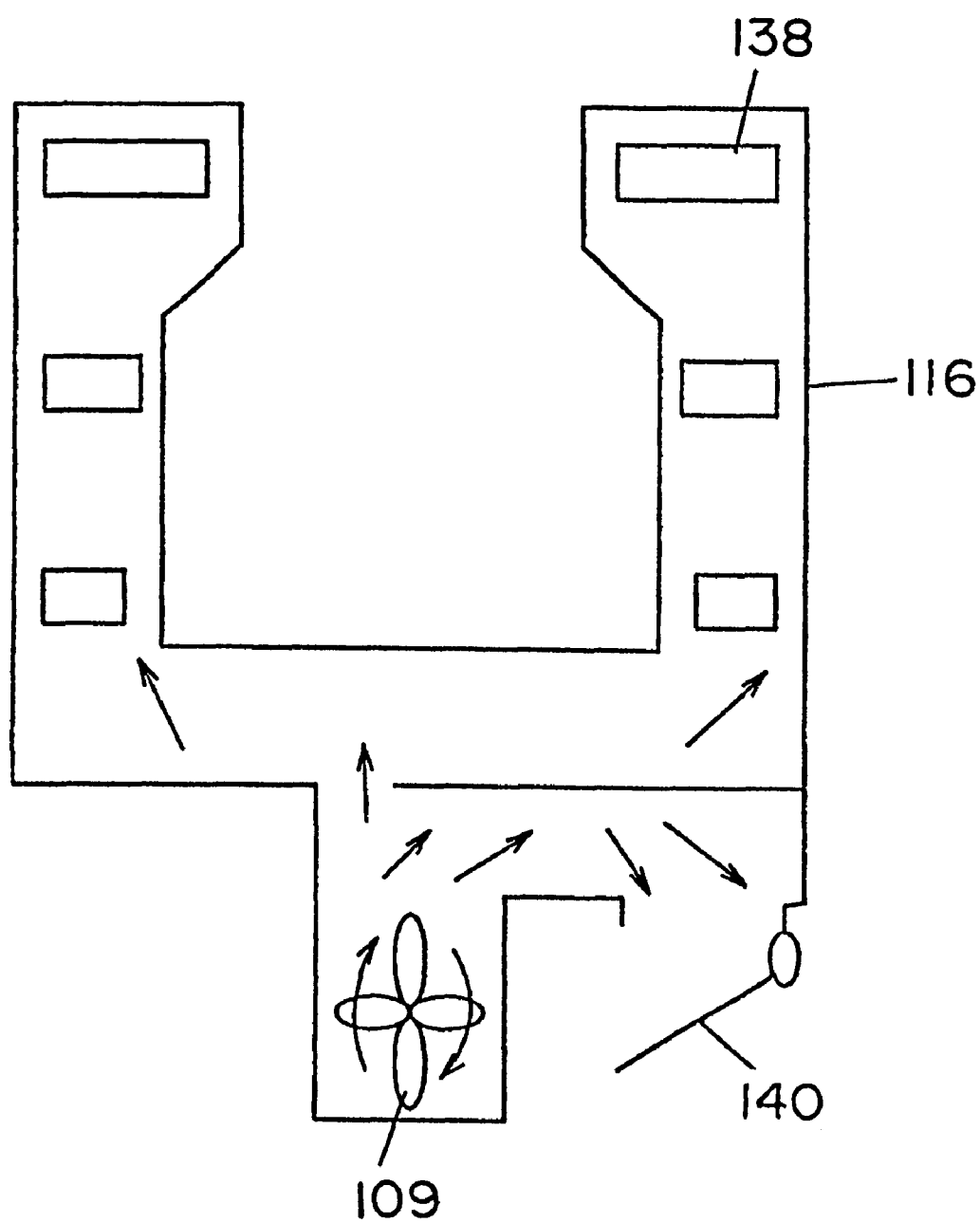
FIG. 5 is a schematic front view of a discharge duct mounted in the refrigerator of FIG. 3.

As shown in FIG. 5, the discharge duct 116 accommodates the air fan 109 and an electrically-operated damper 140. The temperature within the low-temperature storage chamber 133 is controlled by the operation of the electrically-operated damper 140. The discharge duct 116 has cold air outlets 138 defined therein at upper portions thereof, through which cold air is discharged into the refrigerator compartment 102. The discharge duct 116 also has cold air outlets 135 defined therein below the electrically-operated damper 140 so that cold air is discharged into the low-temperature storage chamber 133 through the cold air outlets 135.

In the above-described construction, when the refrigerator compartment 102 and the low-temperature storage chamber 133 are cooled, the operation of the compressor 111 and that of the air fan 109 are started, and the channel control valve 122 is opened to introduce the refrigerant into the refrigerator cooling unit 110. The air inside the refrigerator compartment 102 is drawn into the refrigerator cooling unit 110 through the suction duct 115 and is cooled by the latent heat of evaporation of the refrigerant inside the refrigerator cooling unit 110. When the electrically-operated damper 140 is opened, the air cooled by the refrigerator cooling unit 110 is divided into two at an upper portion of the air fan 109. A portion of the air is introduced into the refrigerator compartment 102 through the cold air outlets 138, while the other portion of the air passes through the electrically-operated damper 140 and is introduced into the low-temperature storage chamber 133 through the cold air outlets 135.

At this moment, because air flowing through the upper portion of the air fan 109 receives dynamic pressures in a direction of rotation of the air fan 109, a large amount of air is directed towards the electrically-operated damper 140 and is then introduced into the low-temperature storage chamber 133. Accordingly, the low-temperature storage chamber 133 is cooled down to a set temperature more quickly than the refrigerator compartment 102. When the low-temperature storage chamber 133 has been cooled down to the set temperature, the electrically-operated damper 140 is closed and, hence, all the air sent by the air fan 109 is introduced into the refrigerator compartment 102 through the cold air outlets 138 to cool it down to a set temperature.

As discussed hereinabove, because the low-temperature storage chamber 133 is cooled more quickly than the refrigerator compartment 102 by virtue of a high distribution ratio of air, the temperature within the low-temperature storage chamber 133 can be controlled independently of load variations.

Figure 6:
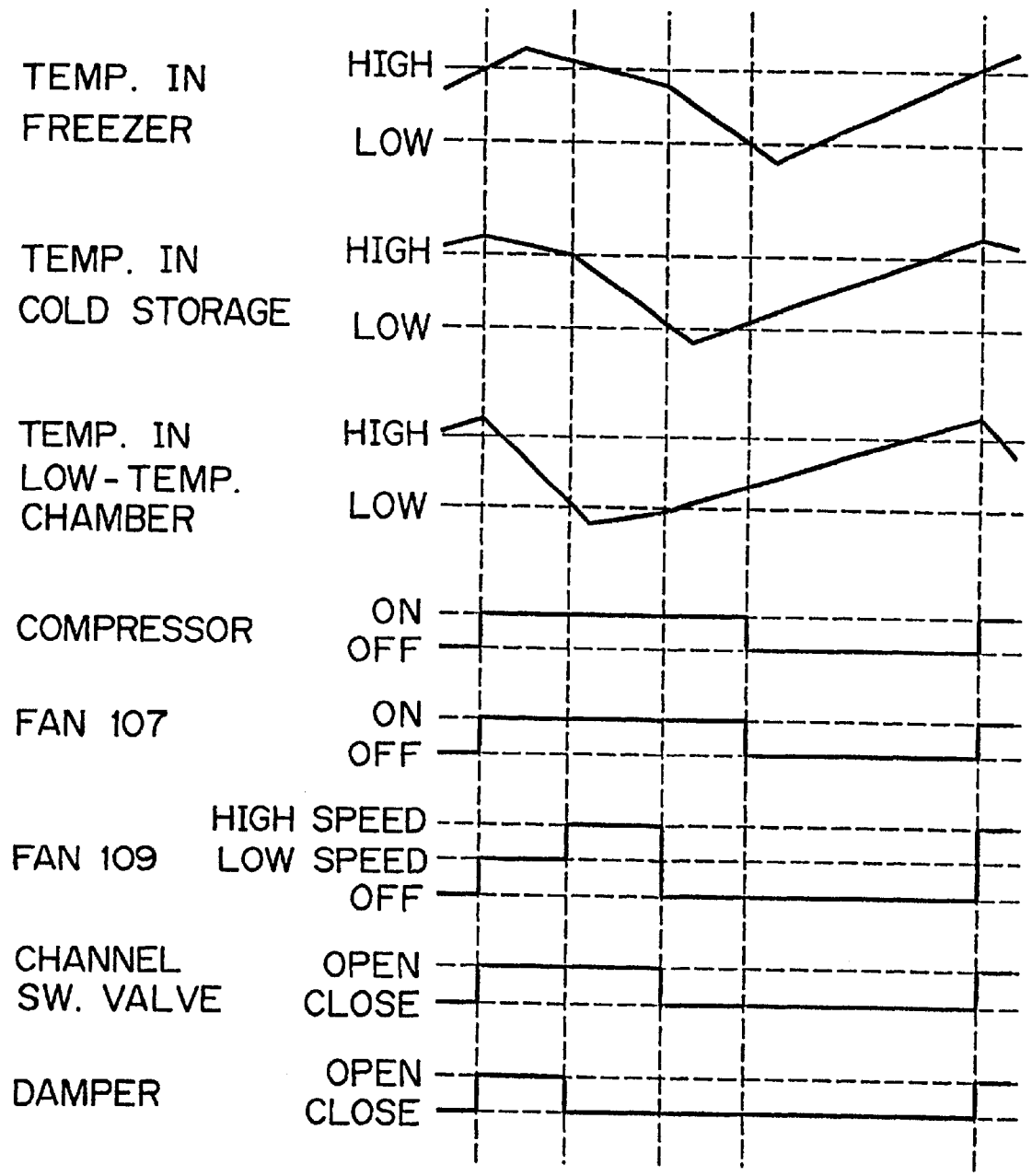
FIG. 6 is a timing chart used to control the refrigerator of FIG. 3.

FIG. 6 depicts a timing chart, based on which the refrigerator according to the present invention is controlled. The air fan 109, controlled according to the timing chart of FIG. 6, has a varying capacity.

At the outset, the compressor 111 and the air fans 107, 109 are all at a standstill, while the channel control valve 122 and the electrically-operated damper 140 are both closed. The temperature within the refrigerator compartment 102, that within the low-temperature storage chamber 133, and that within the freezer compartment 103 are detected by the temperature sensors S1, S2, and S3, respectively.

When the temperature within the freezer compartment 103 detected by the temperature sensor S3 exceeds an upper limit of its predetermined temperature range, the operation of the compressor 111 and that of the air fan 107 are started. At this moment, if the temperature within the refrigerator compartment 102 detected by the temperature sensor S1 exceeds an upper limit of its predetermined temperature range, the channel control valve 122 is opened, and the operation of the air fan 109 is started at a high speed. In addition, if the temperature within the low-temperature storage chamber 133 detected by the temperature sensor S2 exceeds an upper limit of its predetermined temperature range, the electrically-operated damper 140 is opened, and the air fan 109 is operated at a low speed. By so doing, the refrigerant is introduced into the refrigerator cooling unit 110 and then into the freezer cooling unit 108 to cool the freezer compartment 103, the refrigerator compartment 102, and the low-temperature storage chamber 133.

When the detected temperature within the low-temperature storage chamber 133 becomes lower than a lower limit of its predetermined temperature range, the electrically-operated damper 140 is closed, and the air fan 109 is operated at the high speed. Since then, the low-temperature storage chamber 133 is no longer cooled. If the detected temperature within the freezer compartment 103 and that within the refrigerator compartment 102 become lower than respective lower limits of the predetermined temperature ranges, the air fan 107 and the air fan 109 are stopped, respectively. The compressor 111 is stopped simultaneously with the air fan 107.

As described above, when the low-temperature storage chamber 133 is cooled, the air fan 109 is operated at a low speed. As a result, the amount of air flowing through the refrigerator cooling unit 110 is reduced and, hence, the temperature of air introduced into the low-temperature storage chamber 133 becomes low, thus reducing the cooling time of the low-temperature storage chamber 133. Accordingly, even when the cooling load in the refrigerator compartment 102 is low, for example, when the temperature of the open air is low, the low-temperature storage chamber 133 can be cooled down to the set temperature within a reduced period of time of operation of the air fan 109.

Figure 7:
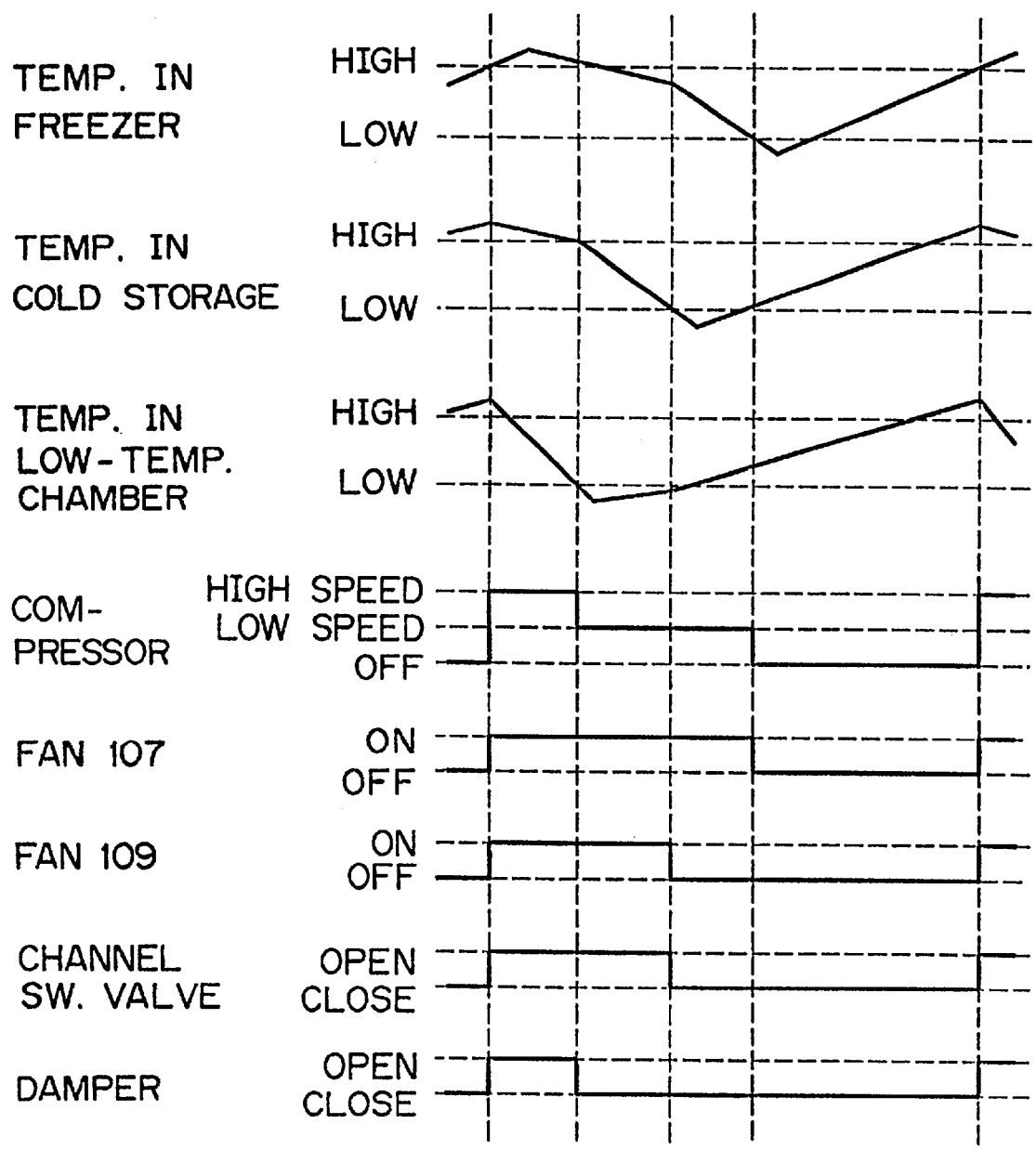
FIG. 7 is a chart similar to FIG. 6, but depicting a modification thereof.

The refrigerator according to the present invention may be controlled based on another timing chart as shown in FIG. 7. The compressor 111, controlled according to the timing chart of FIG. 7, has a varying capacity.

When the detected temperature within the freezer compartment 103 exceeds an upper limit of its predetermined temperature range, the operation of the compressor 111 and that of the air fan 107 are started. At this moment, if the detected temperature within the refrigerator compartment 102 exceeds an upper limit of its predetermined temperature range, the channel control valve 122 is opened, and the operation of the air fan 109 is started. In addition, if the detected temperature within the low-temperature storage chamber 133 exceeds an upper limit of its predetermined temperature range, the electrically-operated damper 140 is opened, and the compressor 111 is operated at a high speed. By so doing, the refrigerant is introduced into the refrigerator cooling unit 110 and then into the freezer cooling unit 108 to cool the freezer compartment 103, the refrigerator compartment 102, and the low-temperature storage chamber 133.

When the detected temperature within the low-temperature storage chamber 133 becomes lower than a lower limit of its predetermined temperature range, the electrically-operated damper 140 is closed, and the compressor 111 is operated at a low speed. If the detected temperature within the freezer compartment 103 and that within the refrigerator compartment 102 become lower than respective lower limits of the predetermined temperature ranges, the air fan 107 and the air fan 109 are stopped, respectively. The compressor 111 is stopped simultaneously with the air fan 107.

As described above, when the low-temperature storage chamber 133 is cooled, the compressor 111 is operated at a high speed. As a result, the temperature of evaporation in the refrigerator cooling unit 110 becomes low and, hence, both the temperature of air passing through the refrigerator cooling unit 110 and that of air introduced into the low-temperature storage chamber 133 drop, thus reducing the cooling time of the low-temperature storage chamber 133. Accordingly, even when the cooling load in the refrigerator compartment 102 is low, for example, when the temperature of the open air is low, the low-temperature storage chamber 133 can be cooled down to the set temperature within a reduced period of time of operation of the air fan 109.

Figure 8:
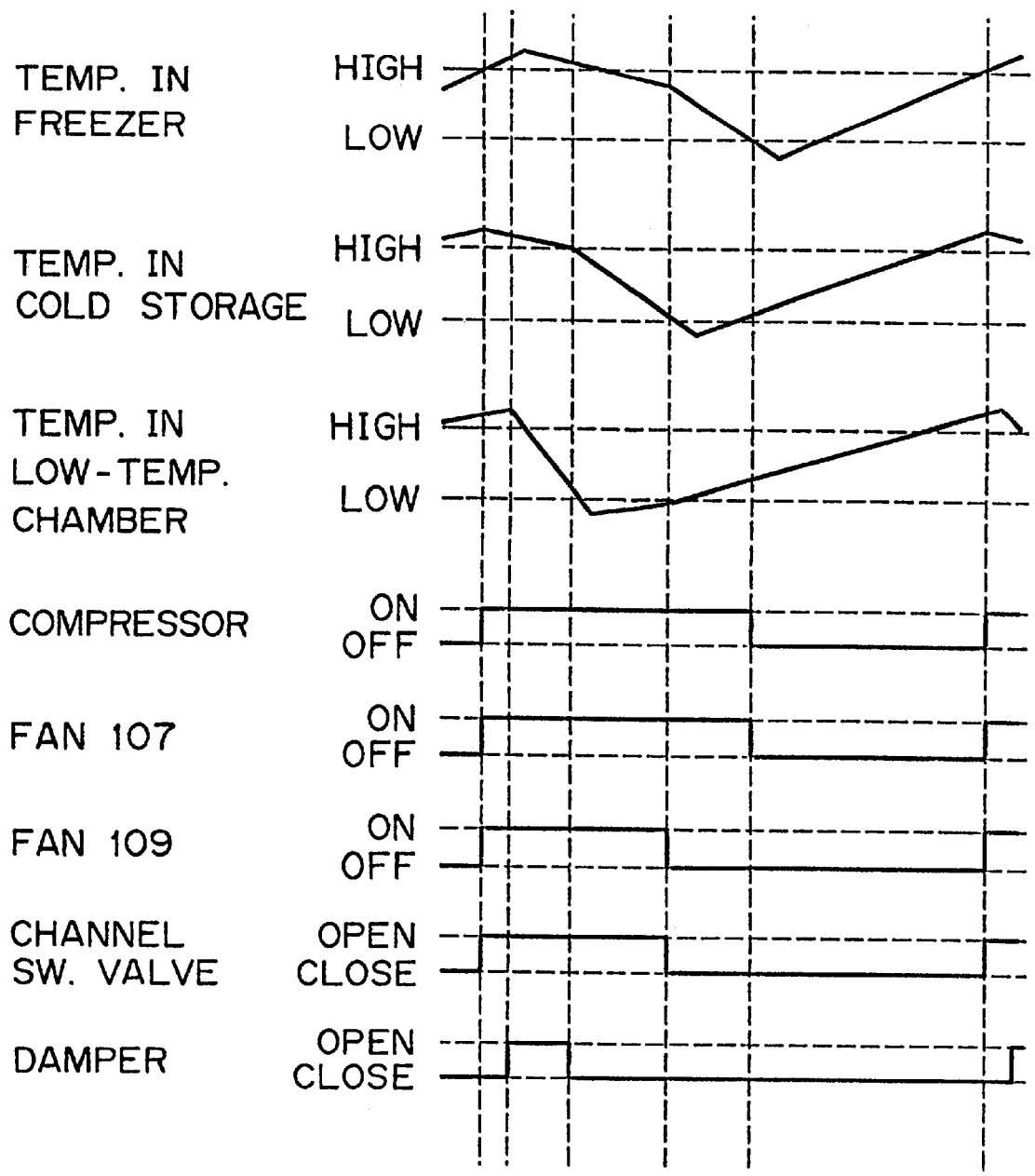
FIG. 8 is a chart similar to FIG. 6, but depicting another modification thereof.

FIG. 8 depicts a further timing chart, based on which the refrigerator according to the present invention is controlled.

When the detected temperature within the freezer compartment 103 exceeds an upper limit of its predetermined temperature range, the operation of the compressor 111 and that of the air fan 107 are started. At this moment, if the detected temperature within the refrigerator compartment 102 exceeds an upper limit of its predetermined temperature range, the channel control valve 122 is opened, and the operation of the air fan 109 is started. In addition, if the detected temperature within the low-temperature storage chamber 133 exceeds an upper limit of its predetermined temperature range, a timer is activated. By so doing, the refrigerant is introduced into the refrigerator cooling unit 110 and then into the freezer cooling unit 108 to start cooling the freezer compartment 103 and the refrigerator compartment 102. When the timer times out or records a predetermined period of time, the electrically-operated damper 140 is opened, and the cooling of the low-temperature storage chamber 133 is started.

When the detected temperature within the low-temperature storage chamber 133 becomes lower than a lower limit of its predetermined temperature range, the electrically-operated damper 140 is closed. If the detected temperature within the freezer compartment 103 and that within the refrigerator compartment 102 become lower than respective lower limits of the predetermined temperature ranges, the air fan 107 and the air fan 109 are stopped, respectively. The compressor 111 is stopped simultaneously with the air fan 107.

As described above, when the cooling of the low-temperature storage chamber 133 is desired, the opening of the electrically-operated damper 140 is delayed by a predetermined period of time, thereby cooling the refrigerator compartment 102 prior to the cooling of the low-temperature storage chamber 133. When the electrically-operated damper 140 is opened, the temperature within the refrigerator cooling unit 110 drops sufficiently. At this moment, the temperature of air having passed the refrigerator cooling unit 110 is lower than that within the low-temperature storage chamber 133 and, hence, the low-temperature storage chamber 133 is cooled by low-temperature air from the start of the cooling, making it possible to reduce the cooling time of the low-temperature storage chamber 133 and reduce the width of temperature variations in the low-temperature storage chamber 133.

It is to be noted here that the electrically-operated damper 140 can be similarly controlled using the detected temperature of the refrigerator cooling unit 110, that of air discharged into the refrigerator compartment 102 or the like.

Figure 9:
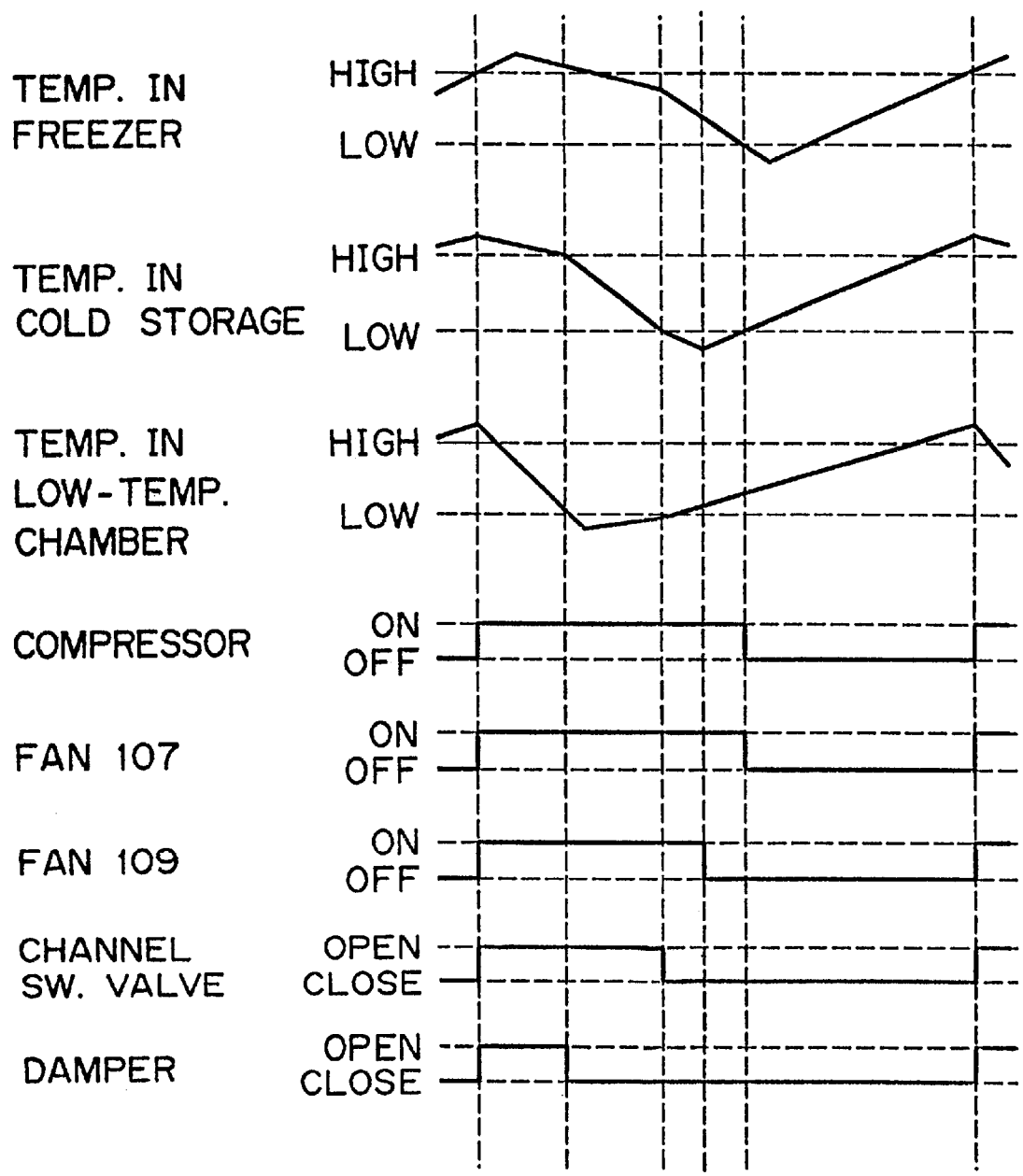
FIG. 9 is a chart similar to FIG. 6, but depicting a further modification thereof.

FIG. 9 depicts a still further timing chart, based on which the refrigerator according to the present invention is controlled.

When the detected temperature within the freezer compartment 103 exceeds an upper limit of its predetermined temperature range, the operation of the compressor 111 and that of the air fan 107 are started. At this moment, if the detected temperature within the refrigerator compartment 102 exceeds an upper limit of its predetermined temperature range, the channel control valve 122 is opened, and the operation of the air fan 109 is started. In addition, if the detected temperature within the low-temperature storage chamber 133 exceeds an upper limit of its predetermined temperature range, the electrically-operated damper 140 is opened. By so doing, the refrigerant is introduced into the refrigerator cooling unit 110 and then into the freezer cooling unit 108 to cool the freezer compartment 103, the refrigerator compartment 102, and the low-temperature storage chamber 133.

When the detected temperature within the low-temperature storage chamber 133 becomes lower than a lower limit of its predetermined temperature range, the electrically-operated damper 140 is closed, thereby cooling only the refrigerator compartment 102. If the detected temperature within the refrigerator compartment 102 becomes lower than a lower limit of the predetermined temperature range, the channel control valve 122 is closed and a timer is activated. When the timer times out or records a predetermined period of time, the operation of the air fan 109 is stopped. If the detected temperature within the freezer compartment 103 becomes lower than a lower limit of the predetermined temperature range, the operation of the air fan 107 and that of the compressor 111 are simultaneously stopped.

As described above, because the operation of the air fan 109 continues even after the channel control valve 122 has been closed, the refrigerant remaining in the refrigerator cooling unit 110 evaporates immediately, and the cold air flows uniformly into the refrigerator compartment 102 through the cold air outlets 138, thus eliminating a problem of lowering the temperature of a lower portion of the refrigerator compartment 102 below a set temperature. This problem has been hitherto caused by the refrigerant remaining in the refrigerator cooling unit 110 after the channel control valve 122 has been closed. Such refrigerant acts to cool the air around the refrigerator cooling unit 110, which air in turn flows downwardly to the lower portion of the refrigerator compartment 102 through the suction duct 115 by convection and lowers the temperature thereof.

Furthermore, the latent heat of sublimation or fusion of dewdrops adhering to the refrigerator cooling unit 110 can be utilized for the cooling of the refrigerator compartment 102, making it possible to reduce the power consumption.

Also, because the quantity of dewdrops adhering to the refrigerator cooling unit 110 per unit cooling time of the refrigerator cooling unit 110 is reduced, the period of time required to defrost the refrigerator cooling unit 110 can be prolonged, resulting in a reduction in power consumption.

Figure 10:
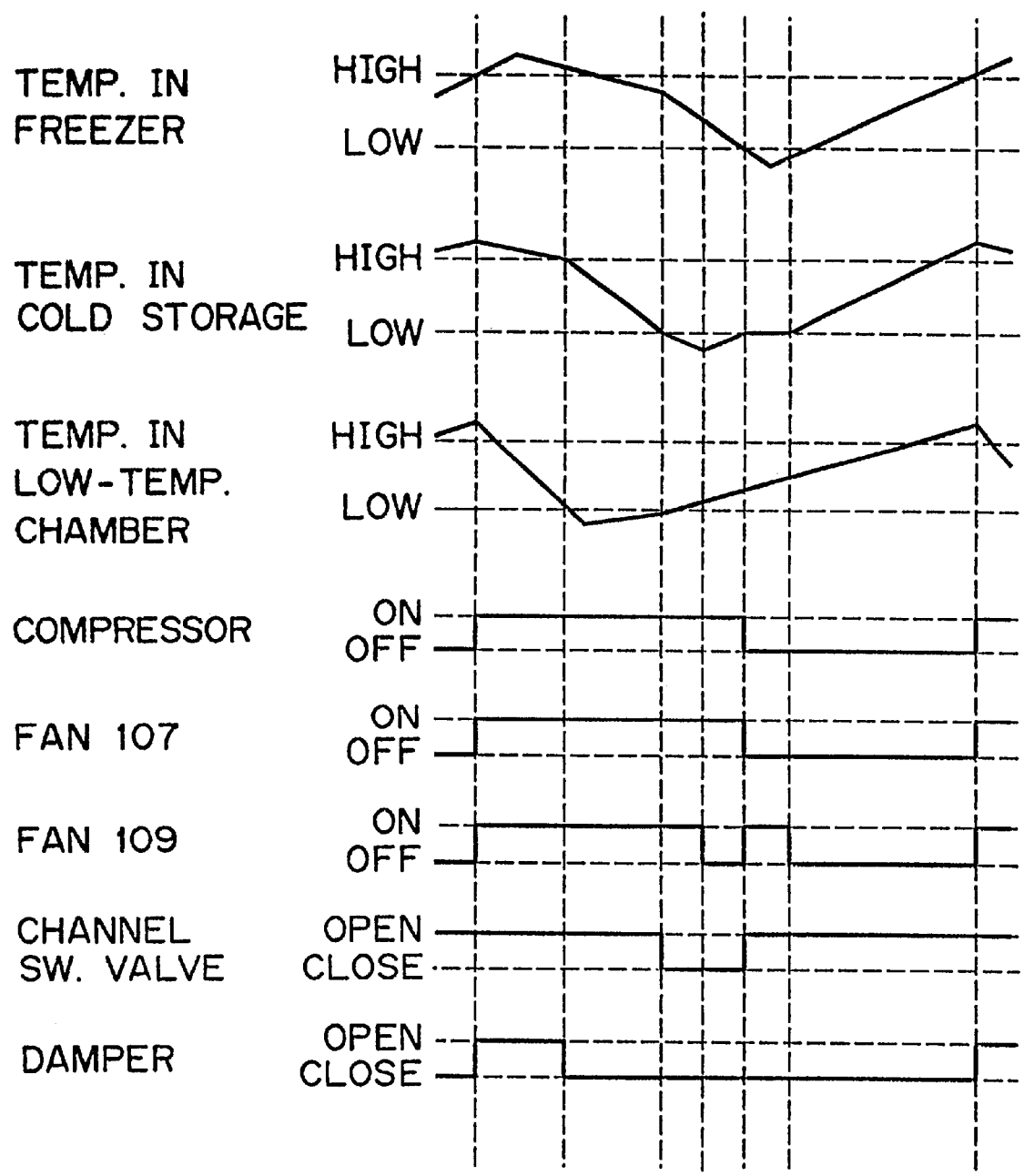
FIG. 10 is a chart similar to FIG. 6, but depicting a still further modification thereof.

FIG. 10 depicts another timing chart that is used to control the refrigerator according to the present invention.

When the detected temperature within the freezer compartment 103 exceeds an upper limit of its predetermined temperature range, the operation of the compressor 111 and that of the air fan 107 are started. At this moment, if the detected temperature within the refrigerator compartment 102 exceeds an upper limit of its predetermined temperature range, the channel control valve 122 is opened, and the operation of the air fan 109 is started. In addition, if the detected temperature within the low-temperature storage chamber 133 exceeds an upper limit of its predetermined temperature range, the electrically-operated damper 140 is opened. By so doing, the refrigerant is introduced into the refrigerator cooling unit 110 and then into the freezer cooling unit 108 to cool the freezer compartment 103, the refrigerator compartment 102, and the low-temperature storage chamber 133.

When the detected temperature within the low-temperature storage chamber 133 becomes lower than a lower limit of its predetermined temperature range, the electrically-operated damper 140 is closed, thereby cooling only the refrigerator compartment 102. If the detected temperature within the refrigerator compartment 102 becomes lower than a lower limit of the predetermined temperature range, the channel control valve 122 is closed and the operation of the air fan 109 is stopped. If the detected temperature within the freezer compartment 103 becomes lower than a lower limit of the predetermined temperature range, the operation of the air fan 107 is stopped. The compressor 111 is stopped simultaneously with the air fan 107.

When the compressor 111 is stopped, a timer is activated. At this moment, the channel control valve 122 is opened, while the operation of the air fan 109 is started. When the timer records a predetermined period of time, the air fan 109 is stopped.

As described above, because the channel control valve 122 is opened simultaneously with a stop of the compressor 111, even if the refrigerant flows into the refrigerator cooling unit 110, the refrigerant evaporates immediately, and cold air flows uniformly into the refrigerator compartment 102 through the cold air outlets 138, thus preventing the temperature of the lower portion of the refrigerator compartment 102 from dropping below the set temperature.

Figure 11:
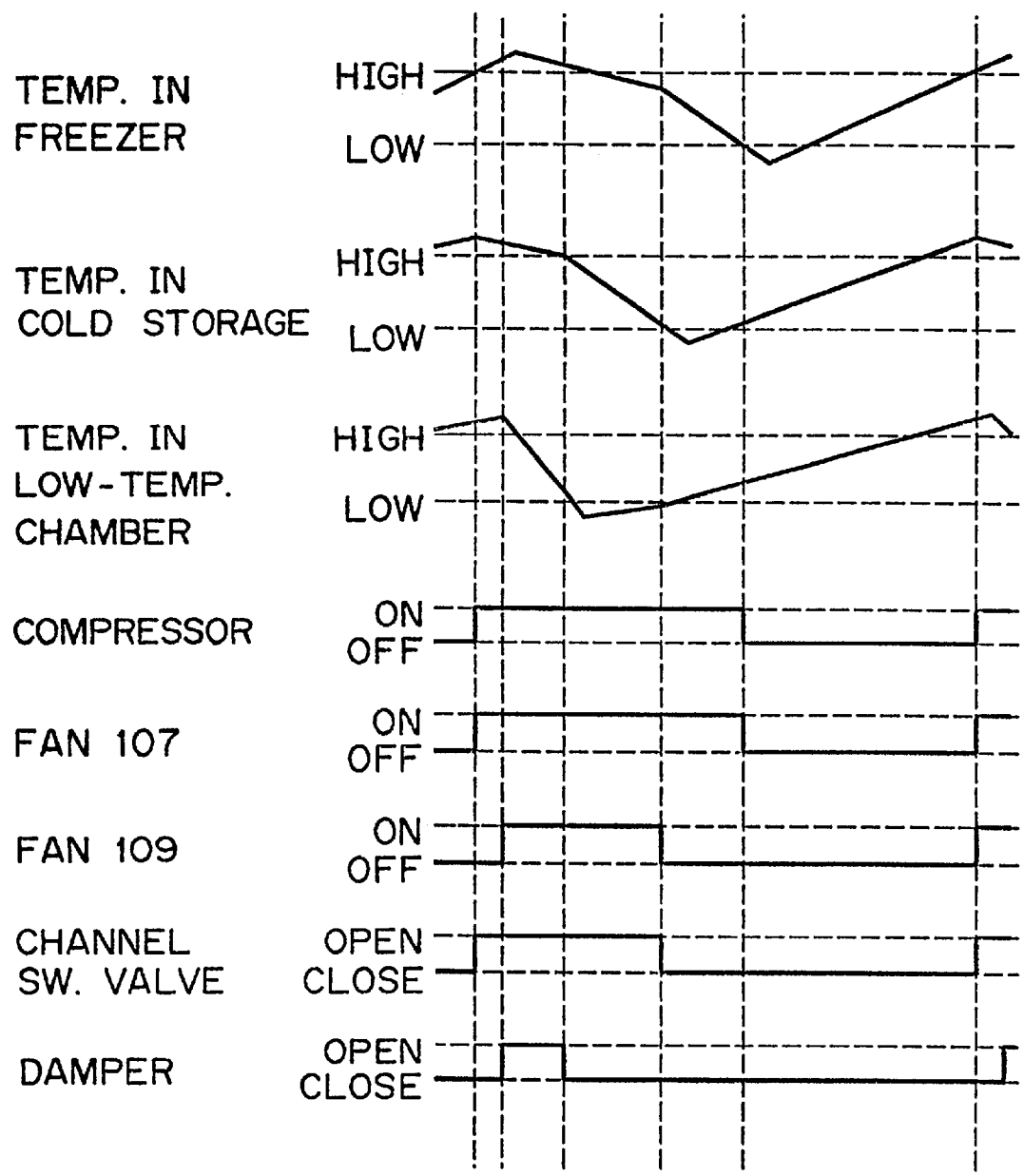
FIG. 11 is a chart similar to FIG. 6, but depicting another modification thereof.

FIG. 11 depicts still another timing chart that is used to control the refrigerator according to the present invention.

When the detected temperature within the freezer compartment 103 exceeds an upper limit of its predetermined temperature range, the operation of the compressor 111 and that of the air fan 107 are started. At this moment, if the detected temperature within the refrigerator compartment 102 exceeds an upper limit of its predetermined temperature range, the channel control valve 122 is opened to allow the refrigerant to flow into the refrigerator cooling unit 110. In addition, if the detected temperature within the low-temperature storage chamber 133 exceeds an upper limit of its predetermined temperature range, a timer is activated. When the timer records a predetermined period of time, the operation of the air fan 109 is started, and the electrically-operated damper 140 is opened, thereby cooling the refrigerator compartment 102 and the low-temperature storage chamber 133.

When the detected temperature within the low-temperature storage chamber 133 becomes lower than a lower limit of its predetermined temperature range, the electrically-operated damper 140 is closed. If the detected temperature within the freezer compartment 103 and that within the refrigerator compartment 102 become lower than respective lower limits of the predetermined temperature ranges, the air fans 107 and 109 are stopped, respectively. The compressor 111 is stopped simultaneously with the air fan 107.

As described above, when the cooling of the low-temperature storage chamber 133 is started simultaneously with the cooling of the refrigerator compartment 102, the operation of the air fan 109 is delayed by the predetermined period of time, and after the temperature within the refrigerator cooling unit 110 has dropped sufficiently, both the refrigerator compartment 102 and the low-temperature storage chamber 133 are cooled by operating the air fan 109. Accordingly, the temperature of air having passed the refrigerator cooling unit 110 is lower than the temperature within the low-temperature storage chamber 133. By so doing, the low-temperature storage chamber 133 is cooled with the low-temperature air from the start of the cooling, making it possible to reduce the cooling time of the low-temperature storage chamber 133 and reduce the width of temperature variations in the low-temperature storage chamber 133.

Figure 12:
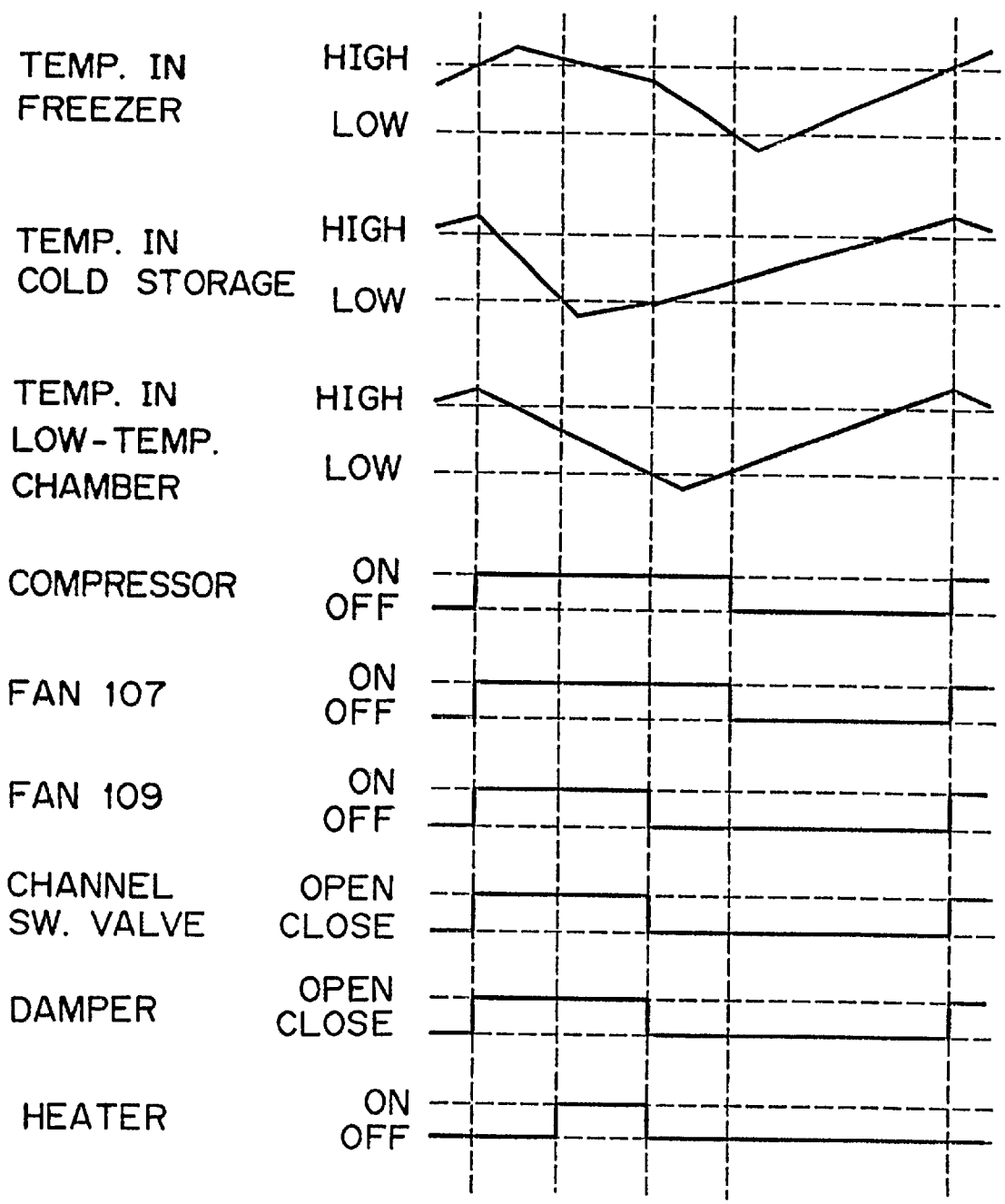
FIG. 12 is a chart similar to FIG. 6, but depicting still another modification thereof.

FIG. 12 depicts another timing chart that is used to control the refrigerator according to the present invention.

When the detected temperature within the freezer compartment 103 exceeds an upper limit of its predetermined temperature range, the operation of the compressor 111 and that of the air fan 107 are started. At this moment, if the detected temperature within the refrigerator compartment 102 exceeds an upper limit of its predetermined temperature range, the channel control valve 122 is opened, and the operation of the air fan 109 is started. In addition, if the detected temperature within the low-temperature storage chamber 133 exceeds an upper limit of its predetermined temperature range, the electrically-operated damper 140 is opened. By so doing, the refrigerant is introduced into the refrigerator cooling unit 110 and then into the freezer cooling unit 108 to cool the freezer compartment 103, the refrigerator compartment 102, and the low-temperature storage chamber 133.

If the detected temperature within the refrigerator compartment 102 becomes lower than a lower limit of the predetermined temperature range before the detected temperature within the low-temperature storage chamber 133 becomes lower than a lower limit of the predetermined temperature range, a heater 142 accommodated in the discharge duct 116 is supplied with electricity.

Figure 13:
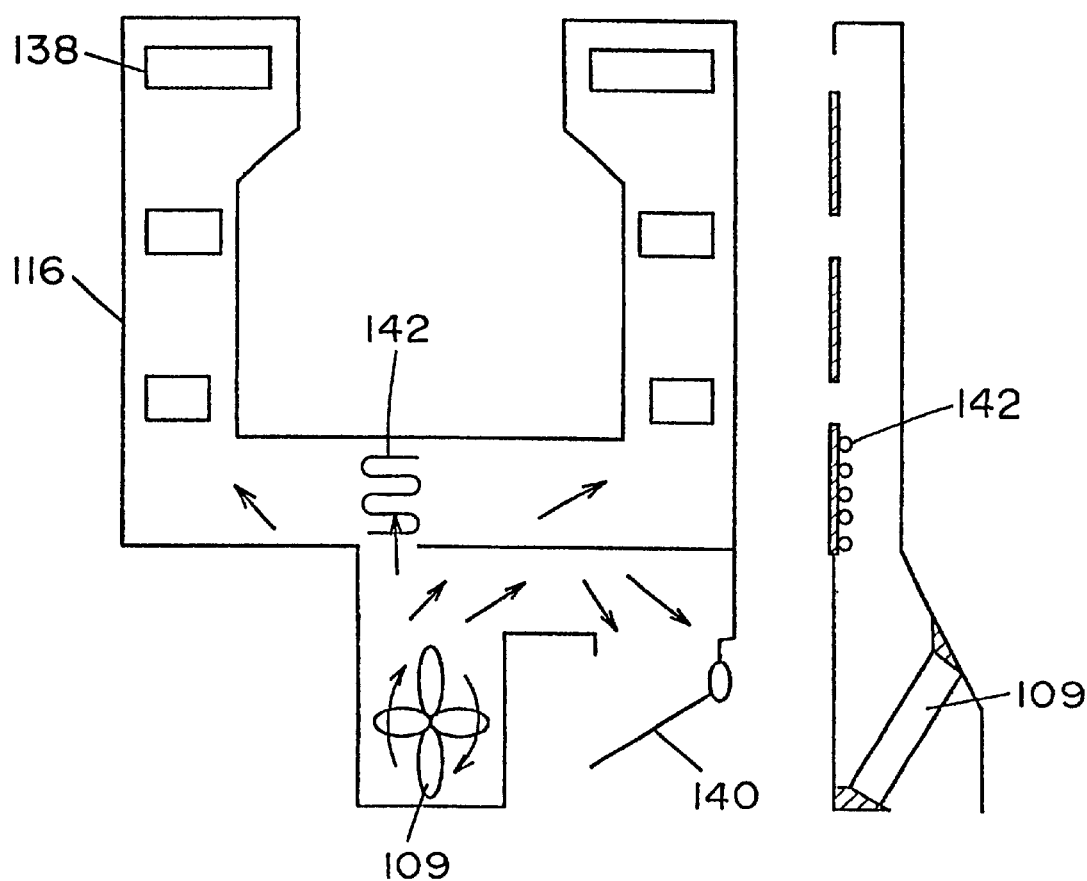
FIG. 13A is a view similar to FIG. 5, but particularly depicting a discharge duct having a heater mounted therein.
FIG. 13B is a vertical sectional view of the discharge duct of FIG. 13A.

As shown in FIG. 13, the heater 142 is mounted on the inner surface of the discharge duct 116 above the air fan 109. If the detected temperature within the low-temperature storage chamber 133 becomes lower than a lower limit of the predetermined temperature range, the electrically-operated damper 140 and the channel control valve 122 are both closed, and the operation of the air fan 109 is stopped. At this moment, electric supply to the heater 142 is also stopped. If the detected temperature within the freezer compartment 103 becomes lower than a lower limit of the predetermined temperature range, the air fan 107 is stopped. The compressor 111 is stopped simultaneously with the air fan 107.

As described above, when the refrigerator compartment 102 has been cooled more quickly than the low-temperature storage chamber 133, only air discharged into the refrigerator compartment 102 through the cold air outlets 138 is heated by the heater 142. Accordingly, even if the cooling load in the refrigerator compartment 102 is low, for example, when the temperature of the open air is low, or even if the cooling load in the low-temperature storage chamber 133 becomes high when foods have been stored therein, a temperature drop below the set temperature in the refrigerator compartment 102 is prevented, while the low-temperature storage chamber 133 is cooled down to the set temperature.

Figure 14:
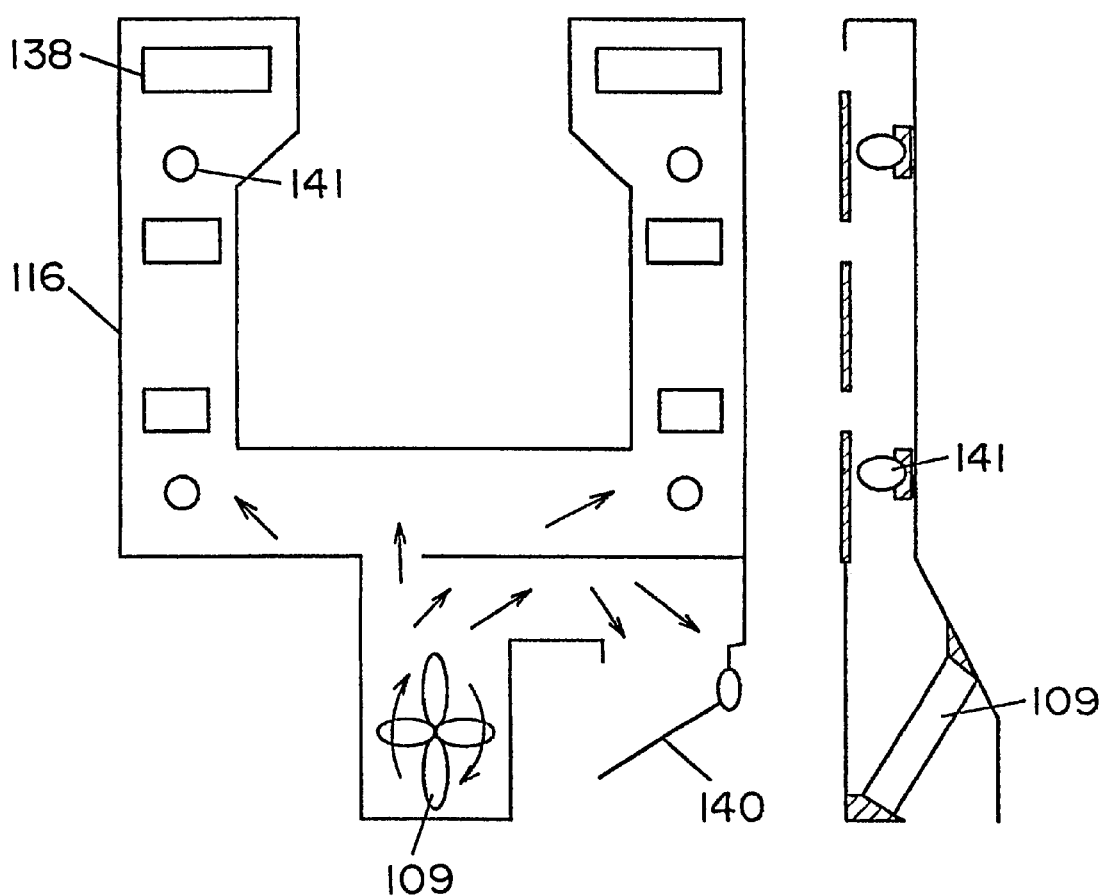
FIG. 14A is a view similar to FIG. 5, but particularly depicting another discharge duct having a plurality of illumination lamps mounted therein.
FIG. 14B is a vertical sectional view of the discharge duct of FIG. 14A.

The heater 142 shown in FIG. 13 may be replaced with a plurality of illumination lamps 141, as shown in FIGS. 14A and 15B. The plurality of illumination lamps 141 are accommodated in the discharge duct 116 at positions upstream of the cold air outlets 138 with respect to the direction of flow of the air.

The illumination lamps 141 are turned on, when the door 104 is opened, to illuminate foods stored in the refrigerator compartment 102. These lamps 141 are also turned on, when the refrigerator compartment 102 is cooled more quickly than the low-temperature storage chamber 133, to heat the air discharged into the refrigerator compartment 102 through the cold air outlets 138. The illumination lamps 141 are turned off simultaneously when the cooling of the low-temperature storage chamber 133 has been terminated.

The use of the illumination lamps 141 in place of the heater 142 for controlling the temperature within the refrigerator compartment 102 contributes to a reduction in the manufacturing cost of the refrigerator.

It is, however, to be noted that the illumination lamps 141 can be used together with the heater 142.

Figure 15:
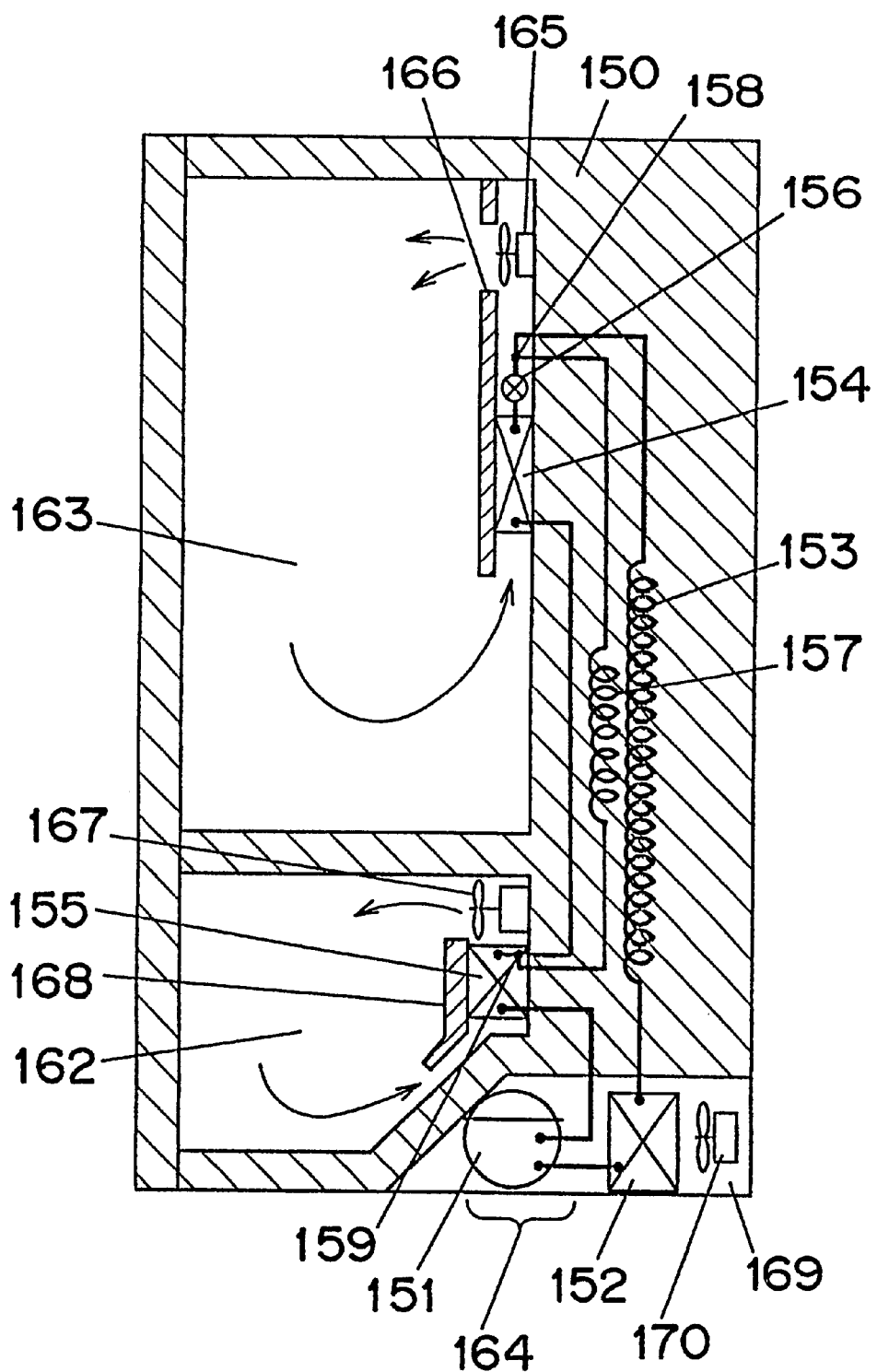
FIG. 15 is a vertical sectional view of a second embodiment of the refrigerator according to the present invention.

FIG. 15 depicts a second embodiment of a bottom-freezer refrigerator according to the present invention.

As shown in FIG. 15, the refrigerator includes a refrigerator body 150 having a refrigerator compartment 163 and a freezer compartment 162 both defined therein at upper and lower portions thereof, respectively. The refrigerator compartment 163 and the freezer compartment 162 are opened and closed by respective doors (not shown) hingedly mounted on a front surface of the refrigerator body 150.

Figure 16:
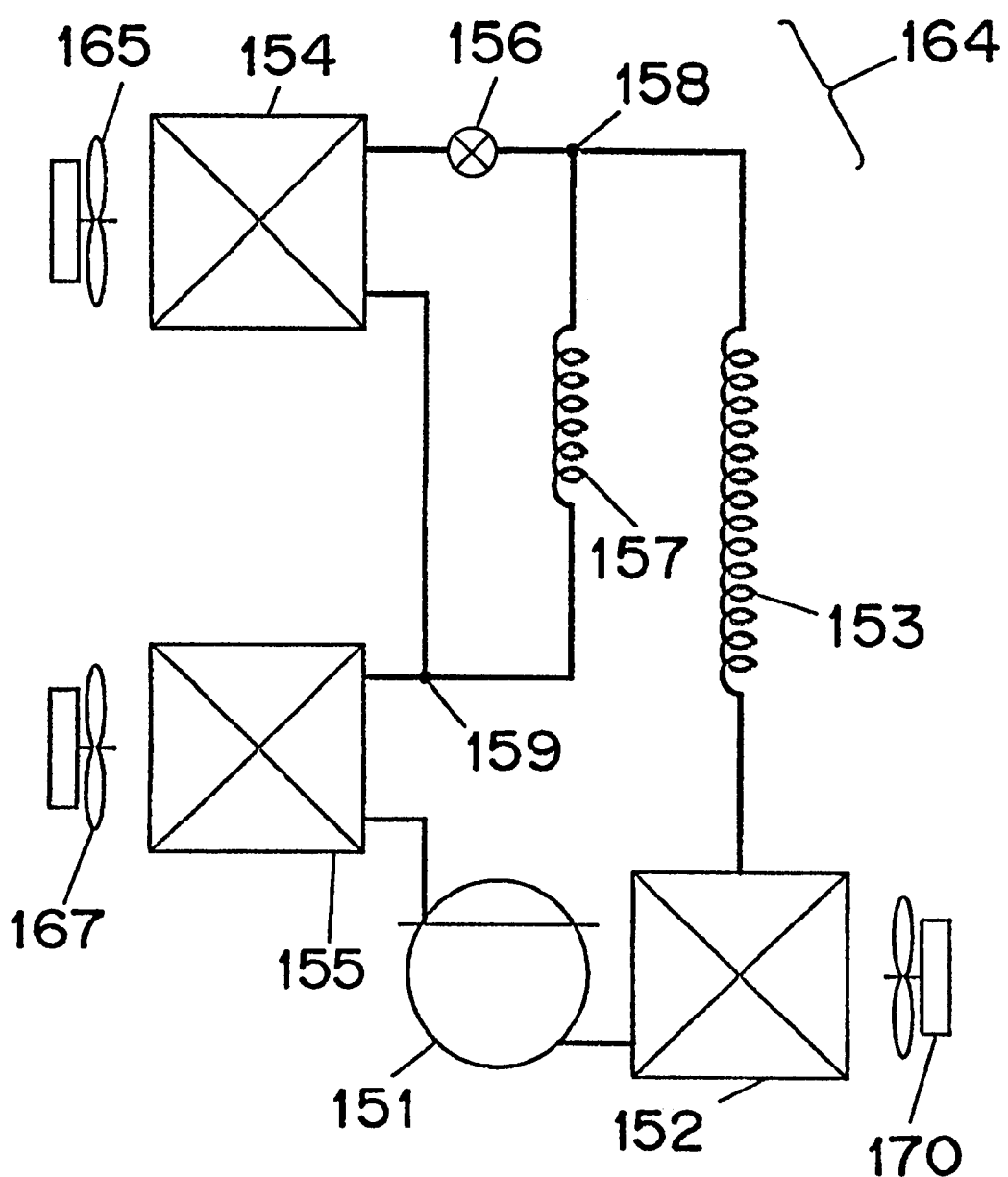
FIG. 16 is a block diagram of a refrigerating cycle employed in the refrigerator of FIG. 15.

As shown in FIG. 16, a compressor 151, a condenser 152, a first capillary 153 (first pressure reduction means), a self-holding motor-operated valve 156 (channel control valve), a first evaporator 154, and a second evaporator 155 are sequentially connected into a refrigerating cycle 164. The refrigerating cycle 164 is also composed of a bypass conduit having a second pressure reduction means 157 for connecting a flow-dividing portion 158 positioned between the first pressure reduction means 153 and the motor-operated valve 156, and a flow-merging portion 159 positioned between the first evaporator 154 and the second evaporator 155.

The line connecting the motor-operated valve 156, first evaporator 154, and second evaporator 155 has a radius that offers a relatively small resistance to the passage of the refrigerant; for example, a line having roughly the same diameter as lines in the evaporators.

In addition, the first evaporator 154 is located in the refrigerator compartment 163 (for example, on the surface deep inside the refrigerator compartment), and a refrigerator duct 166 and a first motor-operated fan 165 for circulating the internal air of the refrigerator compartment 163 by passing the air through the first evaporator 154 are disposed in the vicinity.

Furthermore, the second evaporator 155 is located in the freezer compartment 162 (for example, on the surface deep inside the freezer compartment), and a freezer duct 168 and a second motor-operated fan 167 for circulating the internal air of the freezer compartment 162 by passing the air through the second evaporator 155 are disposed in the vicinity.

In addition, the motor-operated valve 156 is disposed inside the refrigerator compartment 163, and the flow-dividing portion 158 is also positioned inside the refrigerator compartment 163 (for example, in the vicinity of the motor-operated valve 156). The flow-merging portion 159 is located inside the freezer compartment 162 (for example, in the vicinity of the second evaporator 155).

Although the second capillary 157 and the line connecting the second capillary 157, the first evaporator 154, and the second evaporator 155 may be disposed inside or outside the apparatus, it is best to embed these in the heat-insulated walls to reduce the loss of the refrigerating effect.

In addition, the resistance value of the first capillary 153 is such that there is no constriction between the motor-operated valve 156 and the first evaporator 154, making it possible to select a capillary suited to the refrigerating cycle when the motor-operated valve 156 is open. For the second capillary 157, the setting is also higher than the total resistance value (pressure loss) of the motor-operated valve 156 and the first evaporator 154.

The condenser 152 is located at least partially in a machine chamber 169, and is configured for cooling with a third motor-operated fan 170 provided in the vicinity.

The freezer compartment 162 and the refrigerator compartment 163 are also provided with temperature sensing means (not shown) for sensing the temperature in respective compartments, and with control means (not shown) for controlling the compressor 151, motor-operated valve 156, first motor-operated fan 165, second motor-operated fan 167, and third motor-operated fan 170.

The operation of the refrigerating apparatus thus configured will now be described.

When the temperature inside the freezer compartment 162 rises, the temperature sensing means detects that a predetermined temperature presetting has been exceeded. The control means receives this signal and actuates the compressor 151, second motor-operated fan 167, third motor-operated fan 170, and motor-operated valve 156.

The high-temperature, high-pressure refrigerant discharged by the operation of the compressor 151 is condensed and liquefied by the condenser 152 (which is cooled by the motor-operated fan 170), reduced in pressure by the first capillary 153, and delivered to the flow-dividing portion 158.

The motor-operated valve 156 opens when the temperature sensing means of the refrigerator compartment 163 detects that a predetermined temperature has been exceeded, and closes when the temperature is below the predetermined level. Similarly, the first motor-operated fan 165 is started when the temperature sensing means of the refrigerator compartment 163 detects that a predetermined temperature has been exceeded, and is stopped when the temperature decreases below the predetermined level.

When the motor-operated valve 156 is closed, the refrigerant is admitted through the flow-dividing portion 158 into the second capillary 157, reduced in pressure, and delivered to the second evaporator 155. The air inside the freezer compartment 162 is drawn in through the freezer duct 168 by the operation of the second motor-operated fan 167, heat is exchanged thoroughly, and the refrigerant is vaporized and gasified inside the second evaporator 155. The gasified refrigerant is again drawn into the compressor 151. The heat-exchanged air, which by now has a lower temperature, is discharged.

When the temperature of air inside the freezer compartment 162 is thus lowered and the temperature sensing means detects that the temperature decreased below a predetermined level, the compressor 151, second motor-operated fan 167, and third motor-operated fan 170 are stopped by the control means, and the motor-operated valve 156 is actuated and closed.

In addition, when the temperature sensing means of the refrigerator compartment 163 detects that the predetermined temperature has been exceeded, and the motor-operated valve 156 is opened, the refrigerant flows from the flow-dividing portion 158 through the motor-operated valve 156, reaches the first evaporator 154, and then enters the second evaporator 155. Furthermore, part of the refrigerant in the flow-dividing portion 158 enters the second capillary 157, unites with the aforementioned refrigerant stream in the flow-merging portion 159, and flows into the second evaporator 155. The refrigerant vaporized and gasified by the first evaporator 154 and second evaporator 155 is readmitted into the compressor 151.

Th air inside the refrigerator compartment 163 is drawn in through the refrigerator duct 166 by the operation of the first motor-operated fan 165, heat is exchanged thoroughly, and the refrigerant is partially vaporized and gasified inside the first evaporator 154. The heat-exchanged air, which by now has a comparatively low temperature, is discharged, and the temperature inside the refrigerator compartment 163 is allowed to decrease. When the temperature sensing means detects that this temperature has decreased below the predetermined temperature, the first motor-operated fan 165 is stopped, and the motor-operated valve 156 is actuated and closed.

Similarly, the freezer compartment 162 is cooled by the operation of the second motor-operated fan 167, and when the temperature sensing means detects that the temperature has dropped below the predetermined level, the compressor 151, second motor-operated fan 167, and third motor-operated fan 170 are stopped by the control means, and the motor-operated valve 156 is actuated and closed.

In addition, using a self-holding motor-operated valve (channel control valve) and consuming power solely for actuation during opening or closing are particularly effective from the standpoint of energy conservation. Furthermore, the noise is kept low because the drive means can, for example, be based on a pulse motor or other type of motor.

Cooling and temperature adjustment are accomplished by repeating such procedures. When the motor-operated valve 156 is open, the refrigerant passing through the first capillary 153 flows through the flow-dividing portion 158 and the motor-operated valve 156 without being again restricted by capillaries (comparatively narrow lines) before reaching the first evaporator 154, and a connection is formed using a line whose diameter is roughly the same as that of the evaporators, avoiding situations in which the flow rate into the first evaporator 154 is reduced by the entrainment of a gas-phase refrigerant when the refrigerant flows as a two-phase mixture and the void ratio varies as a result of occasional load changes caused by the ambient temperature conditions of the refrigerating apparatus, replacement of food, opening and closing of the door, and the like.

In addition, the resistance value of the second pressure reduction means is set higher than the combined resistance value of the channel control valve and the first evaporator (the resistance value of the channel control valve and the evaporator is commonly very low), so the refrigerant proceeds into the first evaporator with virtually no resistance. Cooling performance can thus be enhanced without creating any shortage in terms of the cooling of the refrigerator compartment or the flow rate of the refrigerant entering the aforementioned first evaporator for refrigeration cooling when such refrigeration cooling is required.

In addition, the cooling performance is not reduced in any way because the manner in which the flow is divided does not change when the state of the refrigerant is changed by the heat effects demonstrated in the vicinity of the channel control valve.

Furthermore, the resistance value of the second pressure reduction means should be set above the very low combined resistance value of the channel control valve and the first evaporator to prevent the pressure reduction from varying widely due to the opening and closing of the channel control valve. The reduced-pressure resistance of the refrigerating cycle can thus be optimized, and system efficiency increased.

A self-holding motor-operated valve was described as the channel control valve, but a low-cost solenoid valve, which has a simple structure and is easy to control, may also be used.

Embedding the motor-operated valve 156, the flow-dividing portion 158, and the flow-merging portion 159 in a heat-insulated wall is effective for preventing frost from forming on the motor-driven valve or the like.

The condenser may also be disposed outside the back surface of the refrigerator and cooled by natural convection. The same effect can be obtained with a so-called inner condenser, in which lines are placed between the back surface and the heat-insulated wall.

Figure 17:
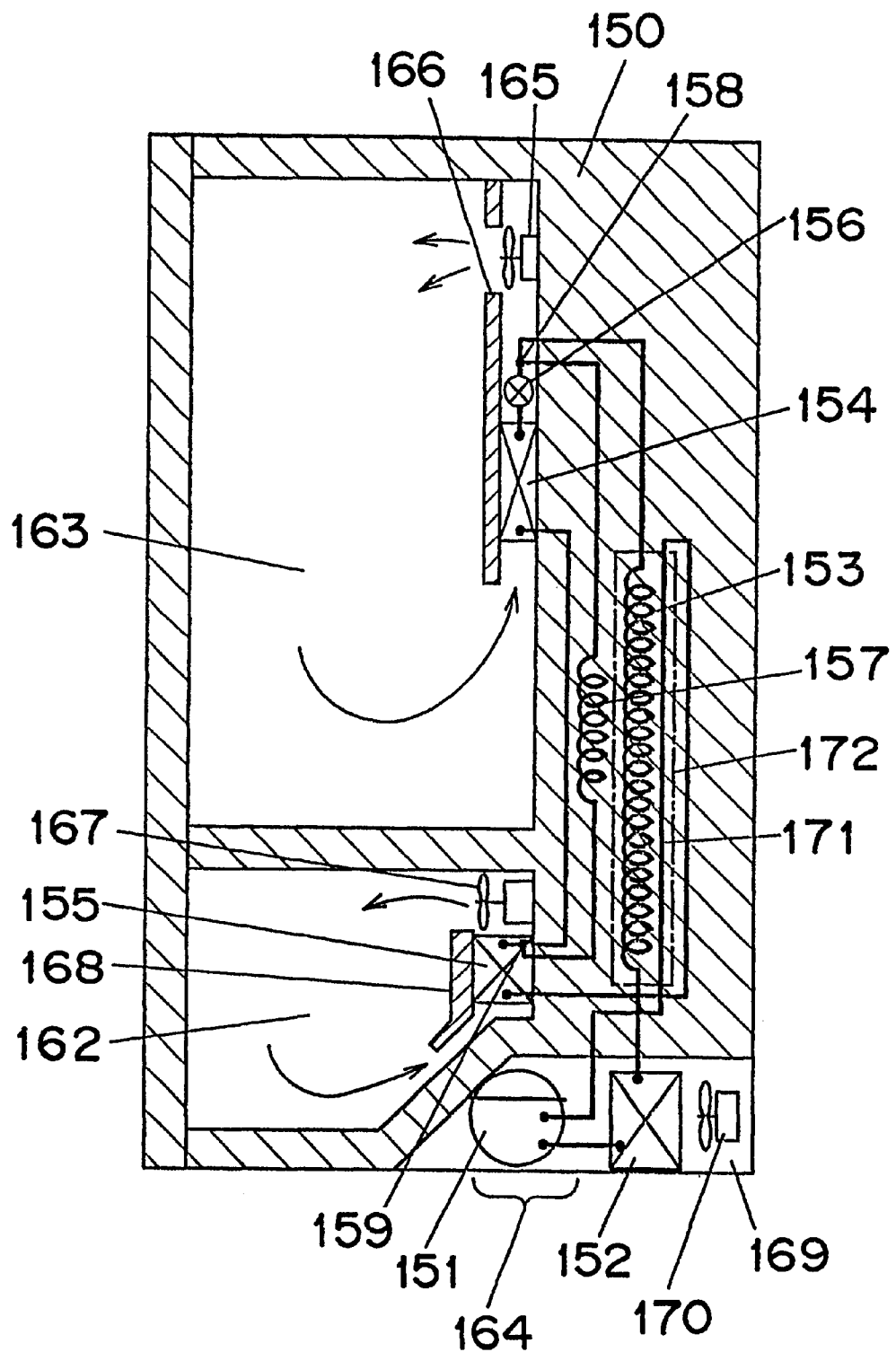
FIG. 17 is a view similar to FIG. 15, but depicting a third embodiment of the refrigerator according to the present invention.

FIG. 17 depicts a third embodiment of a bottom-freezer refrigerator according to the present invention. For structures that are the same as in the second embodiment, no detailed description will be given, and identical symbols are used.

A heat exchanger 172 is provided for exchanging heat between the first capillary 153 and a suction pipe 171 connecting the second evaporator 155 and the compressor 151. This heat exchanger 172 is embedded in a heat-insulated section on the back surface of the refrigerator body 150. In addition, the second capillary 157 is embedded in a heat-insulated material without any heat exchange.

The heat exchanger 172 may be bundled close together with the aid of a tape or the like to prevent penetration of the heat-insulated material. Improvement of heat transfer by soldering is desired.

In addition, increasing the heat-exchange distance is beneficial for achieving adequate heat exchange, but the pressure loss in the suction pipe 171 is increased and efficiency lowered when the distance is too large, so the distance is set between 1000 and 2000 mm.

Heat exchange is thus performed with the first capillary 153 before the refrigerant leaving the second evaporator 155 returns to the compressor 151, and a higher temperature is established in the line leading to the compressor 151 and being in contact with air in the vicinity thereof, making it possible to prevent condensation and arresting the formation of water drops.

In addition, cooling the refrigerant in the first capillary 153 enhances the cooling effect of the refrigerating cycle 164 and provides better cooling performance.

Another feature is that the second capillary 157 is not subjected to heat exchange because when such heat exchange is performed, variations in the amount of heat exchanged during the opening of the motor-operated valve 156 induce changes in the flow rate of the capillary and cause more refrigerant than necessary to be fed to the second evaporator 155, with the result that the amount in which the refrigerant is fed to the first evaporator 154 is reduced, and the first evaporator 154 delivers an inferior cooling performance.

Figure 18:
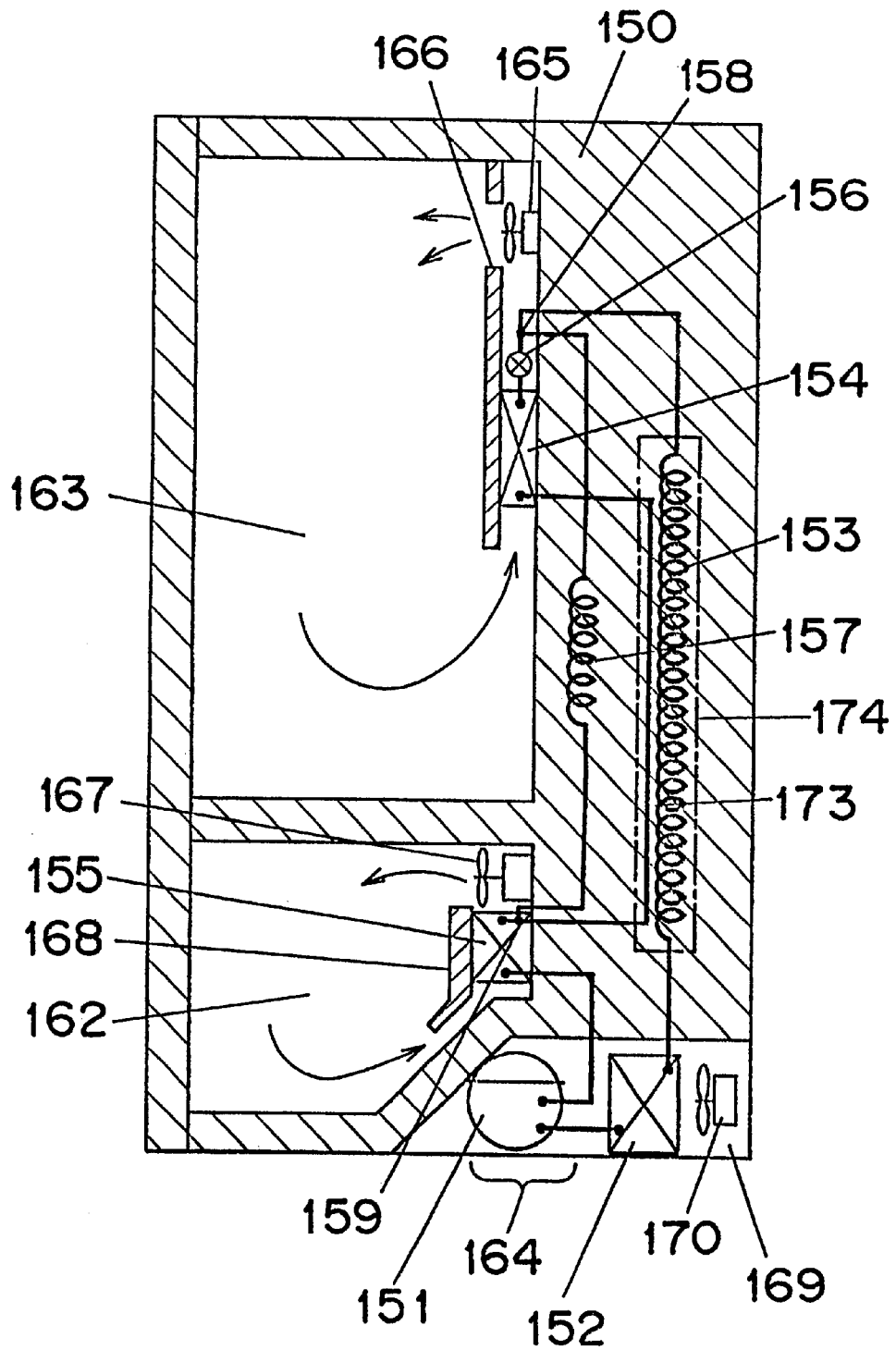
FIG. 18 is a view similar to FIG. 15, but depicting a fourth embodiment of the refrigerator according to the present invention.

FIG. 18 depicts a fourth embodiment of a bottom-freezer refrigerator according to the present invention. For structures that are the same as in the second and third embodiments, no detailed description will be given, and identical symbols will be used.

A heat exchanger 174 is provided for exchanging heat between the first capillary 153 and a connection pipe 173 connecting the first evaporator 154 and the second evaporator 155. This heat exchanger 174 is embedded in a heat-insulated section on the back surface of the refrigerator body 150.

If the line length of the connection pipe 173 is increased, the arrangement of the line is complicated and liquid traps form or the pressure loss increases, making it desirable that the evaporators be connected over the shortest possible distance. Consequently, the heat-exchange distance is established such that heat exchange is performed over a portion of the comparatively long first capillary 153, that is, 500 to 1000 mm.

As a result, cooling the refrigerant in the first capillary 153 enhances the cooling effect of the refrigerating cycle 164 and provides better cooling performance.

In addition, the refrigerant in the first evaporator 154 moves to the second evaporator 155 when the compressor 151 is stopped or the motor-operated valve 156 is closed. Because the liquid refrigerant being moved by a pressure difference cools the first capillary 153, the cooling effect of the refrigerating cycle 164 is enhanced, providing better cooling performance.

Figure 19:
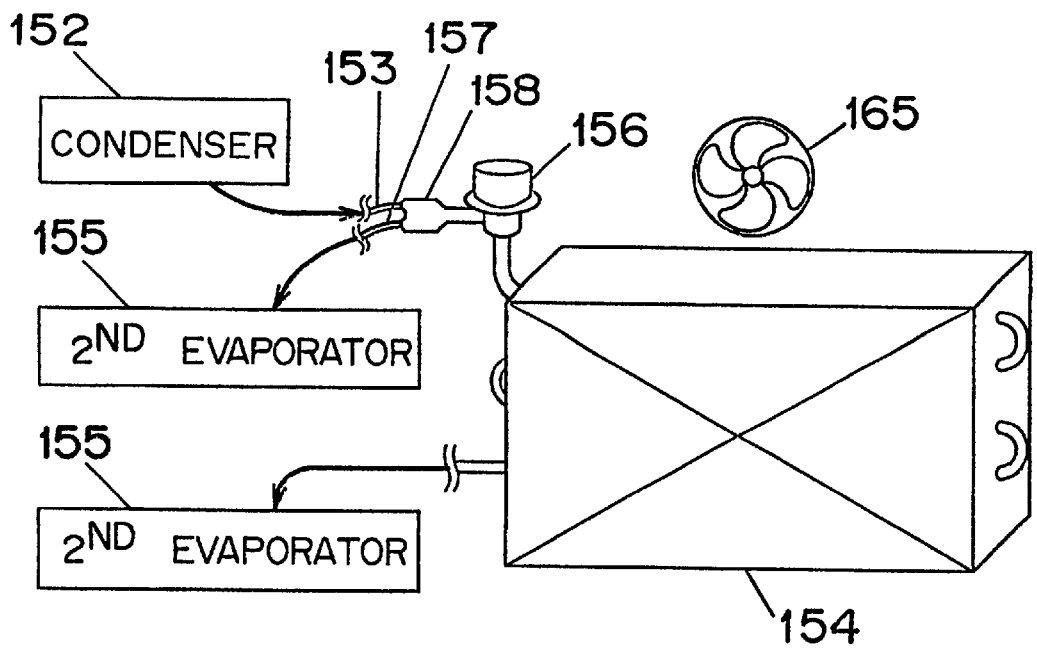
FIG. 19 is a schematic perspective view of a first evaporator and other elements in the vicinity thereof, which are mounted in the refrigerator of FIGS. 15, 17 or 18.

FIG. 19 schematically depicts the area in the vicinity of the first evaporator 154.

As has already been depicted in FIG. 15 with reference to the second embodiment, the freezer compartment 162 is located below the refrigerator compartment 163, and the first evaporator 154 is disposed deep inside the refrigerator compartment 163 and above the second evaporator 155.

The first capillary 153 and the second capillary 157 are connected at the flow-dividing portion 158, providing a connection to the motor-operated valve 156. The motor-operated valve 156 is located above the first evaporator 154, in a void space across from the first motor-operated fan 165.

A connection is established between the motor-operated valve 156 and the inlet line of the first evaporator 154, and a linear structure is formed according to a pass pattern in which a plurality of tube runs are sequentially arranged in a single direction from the top of the evaporator downward. A connection is also established between the outlet line of the first evaporator 154 and the second evaporator 155 via the flow-merging portion 159.

The evaporators are thus devoid of liquid traps, and the refrigerant present in the first evaporator 154 is smoothly transported to the second evaporator 155 by the pressure difference and gravity when a switchover is made by the opening or closing of the motor-operated valve 156 from a circuit that passes through the first evaporator 154 for refrigeration cooling to a circuit that creates a bypass through the second evaporator 155 for freezer cooling.

The efficiency of the refrigerating cycle 164 can therefore be enhanced by avoiding a situation in which a significant gas deficit is produced in the second evaporator 155 for freezer cooling during the switching of the motor-operated valve 156 and the amount of sealed refrigerant must be increased.

In addition, abnormal frosting can be prevented because the motor-operated valve 156 is positioned, in relation to the first evaporator 154, on the downstream side of the air flow created by the first motor-operated fan 165.

Figure 20:
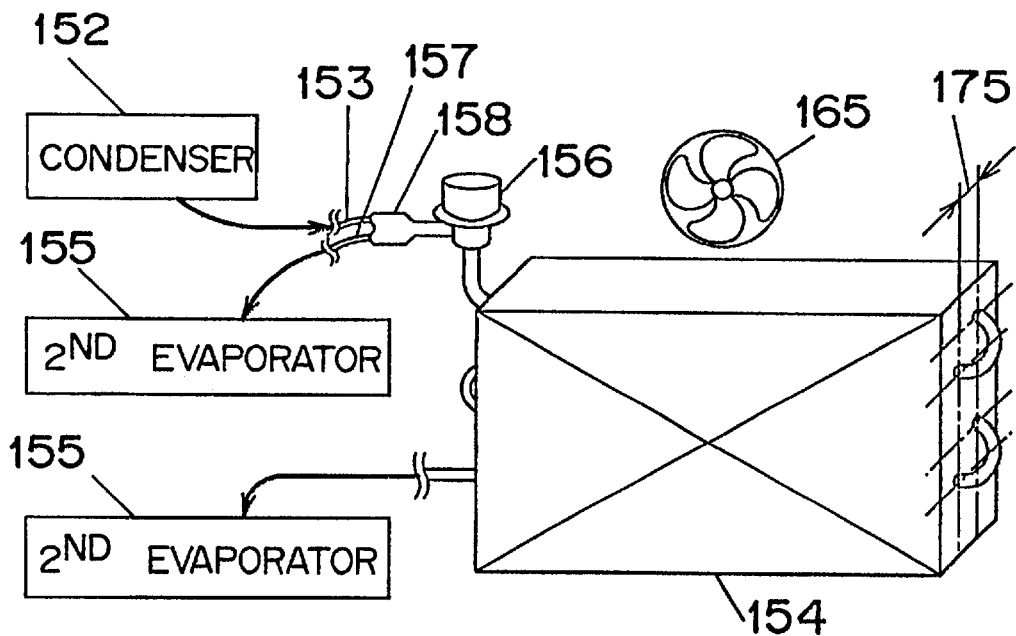
FIG. 20 is a view similar to FIG. 19, but depicting a modification thereof.

FIG. 20 schematically depicts a modification of the first evaporator 154.

As shown in FIG. 20, neighboring tube runs in the first evaporator 154 (fin-coil type) underneath the first motor-operated fan 165 are shifted from each other by a pitch 175 to form a staggered layout in accordance with a pass pattern in which the tube runs are sequentially arranged in a single direction from the top of the evaporator downward, allowing the line to occupy a wider projected area in a cross section perpendicular to the direction of air flow without forming liquid traps in the first evaporator 154. In addition, the heat-transfer coefficient can be increased by the enhanced turbulence in the line, and the efficiency of the cooling system can be raised.

Figure 21:
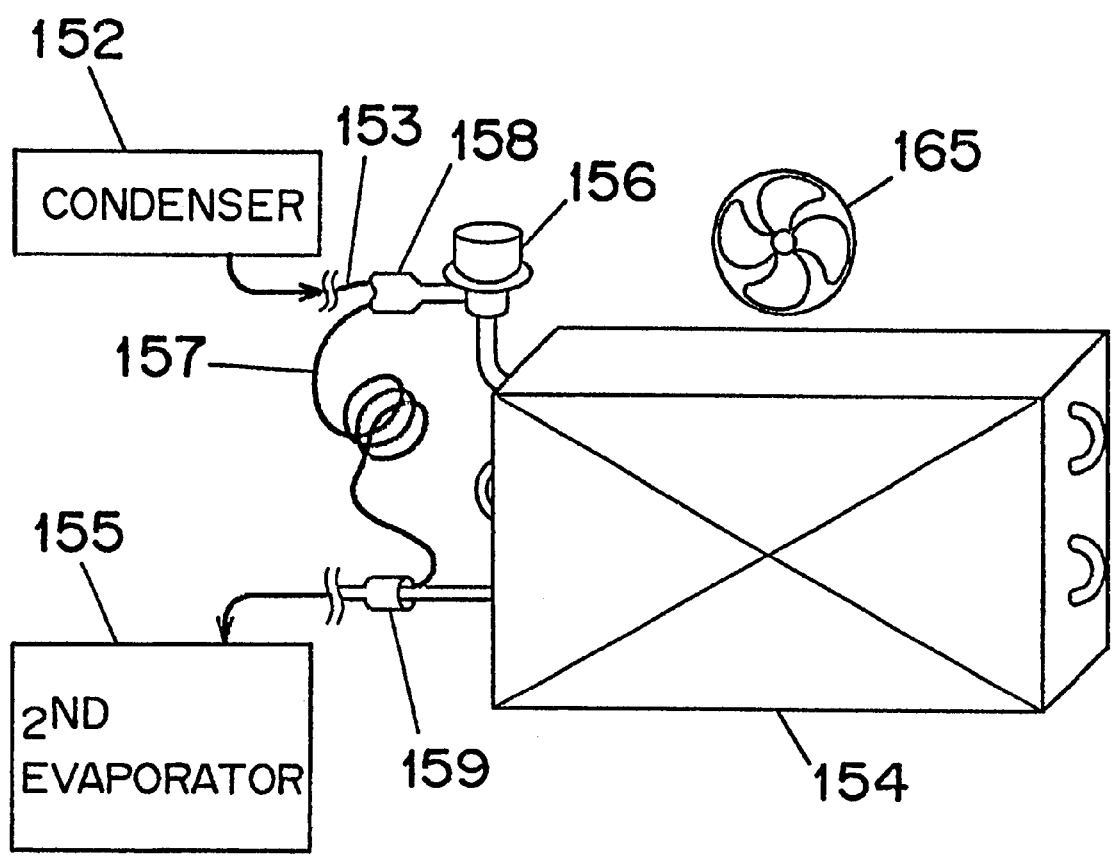
FIG. 21 is a view similar to FIG. 19, but depicting another modification thereof.

FIG. 21 schematically depicts another modification of the arrangement of FIG. 19.

As shown in FIG. 21, the flow-dividing portion 158, the second capillary 157, and the flow-merging portion 159 are disposed in the refrigerator compartment 163, and the flow-merging portion 159 is placed in the vicinity of the outlet line of the first evaporator 154.

With this arrangement, the number of welded connections in the freezer compartment 162 is thus minimized (reduced to two) by employing a simple structure in which the second evaporator 155 is merely connected with the inlet and outlet lines.

Work is thus facilitated at the comparatively inaccessible second evaporator 155 below the first evaporator 154.

In addition, if the first evaporator 154, motor-operated valve 156, second capillary 157, flow-dividing portion 158, and flow-merging portion 159 are integrated into a single unit, this sub-assembled unit can be incorporated into the system itself merely by performing welding at two locations. It is also possible to cut down on labor and to improve welding reliability.

Figure 22:
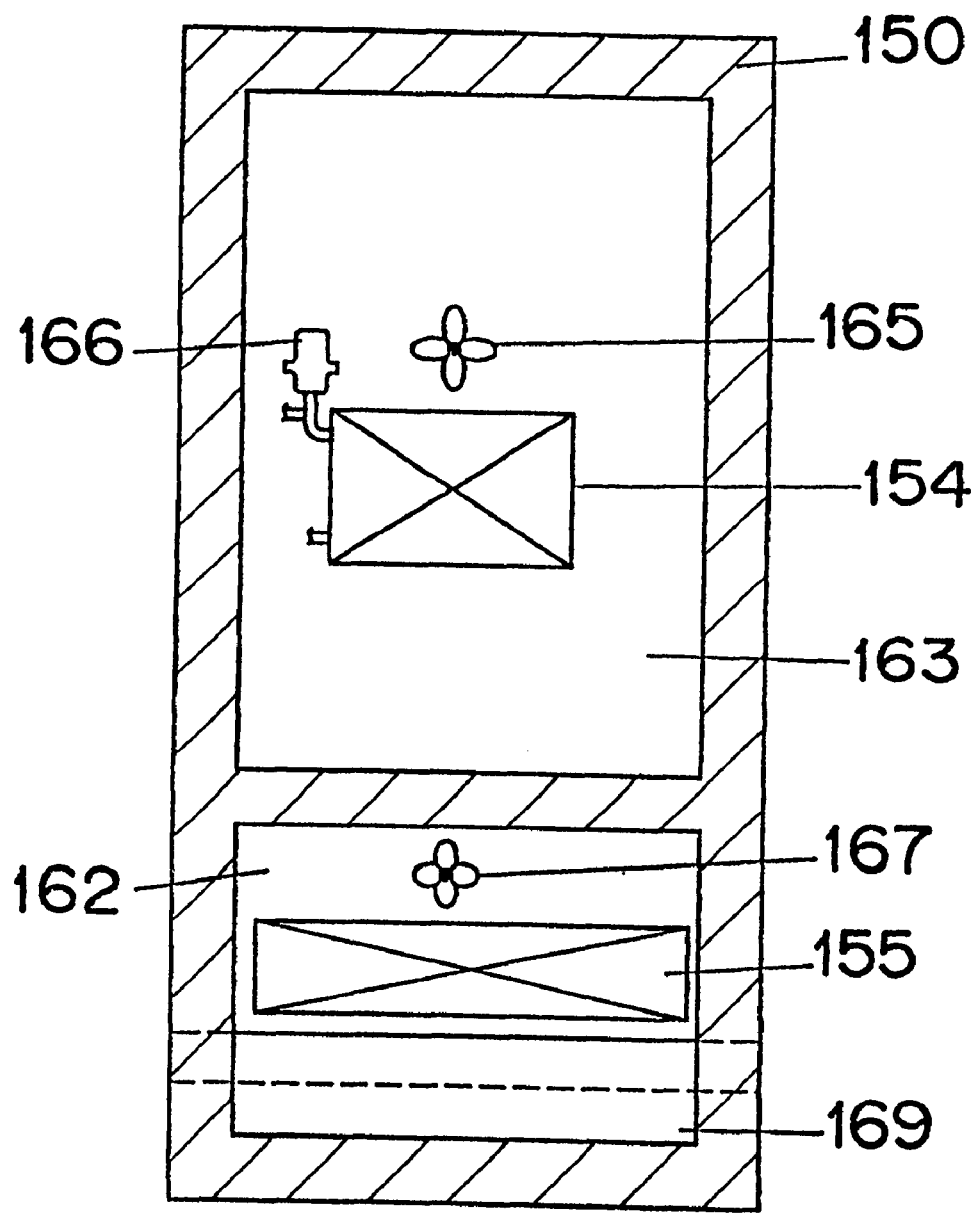
FIG. 22 is a vertical sectional view of a fifth embodiment of the refrigerator according to the present invention.

FIG. 22 depicts a fifth embodiment of a bottom-freezer refrigerator according to the present invention.

The refrigerator shown in FIG. 22 includes a refrigerator body 150 having at least one freezer compartment 162, at least one refrigerator compartment 163 provided above the freezer compartment 162, and a machine chamber 169 provided at a bottom portion of the back surface of the freezer compartment 162. A first evaporator 154 and a motor-operated fan 165 serving as a first cold air circulation means are mounted on the back surface of the refrigerator compartment 163. A motor-operated valve 156 serving as a channel control means is provided above the first evaporator 154, and a motor-operated fan 167 (second cold air circulation means) and a second evaporator 155 are mounted on the back surface of the freezer compartment 162 above the machine chamber 169.

Because the second evaporator 155 is positioned below the first evaporator 154, the refrigerant or the machine oil inside the first evaporator 154 gradually returns to the second evaporator 155 in the direction of gravity when the supply of refrigerant to the first evaporator 154 is stopped by the switching of the motor-operated valve 156. A smooth return of the refrigerant is thus facilitated, and it is unlikely that the refrigerant stays in the first evaporator 154, preventing the cooling performance or reliability from being adversely affected while avoiding situations in which the system operates with a shortage of the refrigerant or machine oil.

Figure 23:
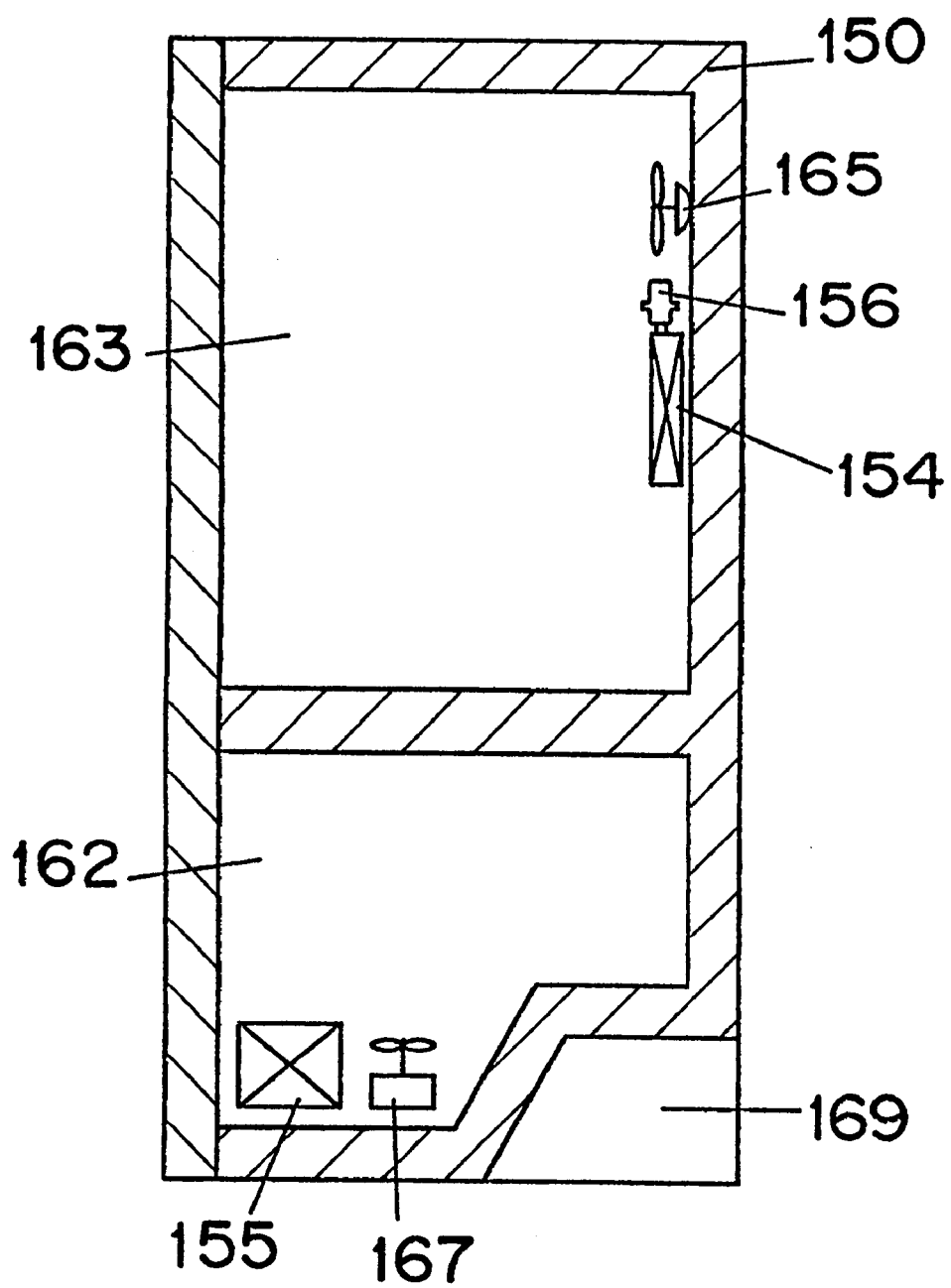
FIG. 23 is a vertical sectional view of a sixth embodiment of the refrigerator according to the present invention.

FIG. 23 depicts a sixth embodiment of a bottom-freezer refrigerator according to the present invention.

As shown in FIG. 23, a first evaporator 154 and a first motor-operated fan 165 are mounted on the back surface of a refrigerator compartment 163, while a second evaporator 155 and a second motor-operated fan 167 are mounted on a bottom portion of a freezer compartment 162 in front of a machine chamber 169.

With this arrangement, the interior of the freezer compartment 162 can be used freely as a storage space, and the difficult-to-use portion of the bottom of the refrigerator body 150 can be used as a space for accommodating the machine chamber 169 and the second evaporator 155, making it possible to configure the inactive capacity in a more efficient manner.

In the case of a drawer-type freezer compartment, the bottom can be made flat all the way to the back surface, increasing the usable internal capacity in practical terms.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A refrigerator having a refrigerator compartment (102) and a freezer compartment (103) both defined therein, said refrigerator compartment (102) having a low-temperature storage chamber (133) of a temperature lower than that of said refrigerator compartment (102), said refrigerator comprising:

a compressor (111), a condenser (112), a first throttling device (113), a channel control valve (122), a refrigerator cooling unit (110), and a freezer cooling unit (108) connected in series to form a refrigerating cycle, said refrigerator cooling unit (110) and said freezer cooling unit (108) being accommodated in said refrigerator compartment (102) and said freezer compartment (103), respectively;

a second throttling device (124) connected in parallel with said refrigerator cooling unit (110);

a first air fan (109) for sending cold air heat-exchanged by said refrigerator cooling unit (110) to said refrigerator compartment (102);

a second air fan (107) for sending cold air heat-exchanged by said freezer cooling unit (108) to said freezer compartment (103);

a suction duct (115) for introducing air inside said refrigerator compartment (102) to said refrigerator cooling unit (110);

a discharge duct (116) for introducing air cooled by said refrigerator cooling unit (110) into said refrigerator compartment (102) and into said low-temperature storage chamber (133); and an electrically-operated damper (140) accommodated in said discharge duet, wherein said electrically-operated damper (140) is opened, an amount of air to be introduced into said low-temperature storage chamber (133) is greater than an amount of air to be introduced into said refrigerator compartment (102).

2. The refrigerator according to claim 1, wherein said first air fan (109) has a varying capacity and can be operated at one of a first speed and a second speed higher than the first speed, and wherein when said low-temperature storage chamber (133) is cooled, said first air fan (109) is operated at the first speed.

3. The refrigerator according to claims 1, wherein said compressor (111) has a varying capacity and can be operated at one of a first speed and a second speed higher than the first speed, and wherein when said low-temperature storage chamber (133) is cooled, said compressor (111) is operated at the second speed.

4. The refrigerator according to claim 1, further comprising a timer, a first temperature detector (51) for detecting a temperature within said refrigerator compartment (102), and a second temperature detector (52) for detecting a temperature within said low-temperature storage chamber (133), wherein when a temperature detected by said first temperature detector (51) is higher than a set temperature of said refrigerator compartment (102) and when a temperature detected by said second temperature detector (52) is higher than a set temperature of said low-temperature storage chamber (133), operation of said first air fan (109) is started, and said electrically-operated damper (140) is opened after a lapse of time recorded by said timer.

5. The refrigerator according to claim 1, further comprising a timer, a first temperature detector (51) for detecting a temperature within said refrigerator compartment (102), and a second temperature detector (52) for detecting a temperature within said low-temperature storage chamber (133), wherein when a temperature detected by said first temperature detector (51) becomes lower than a set temperature of said refrigerator compartment (102) and when a temperature detected by said second temperature detector (52) becomes lower than a set temperature of said low-temperature storage chamber (133), said channel control valve (122) is closed and operation of said first air fan (109) is stopped after a lapse of time recorded by said timer.

6. The refrigerator according to claim 1, wherein said channel control valve (122) is opened simultaneously with a stop of said compressor (111), and said first air fan (109) is operated for a predetermined period of time.

7. The refrigerator according to claim 1, further comprising a first temperature detector (51) for detecting a temperature within said refrigerator compartment (102), and a second temperature detector (52) for detecting a temperature within said low-temperature storage chamber (133), wherein when a temperature detected by said first temperature detector (51) is higher than a set temperature of said refrigerator compartment (102) and when a temperature detected by said second temperature detector (52) is higher than a set temperature of said low-temperature storage chamber (133), said channel control valve (122) is opened and operation of said first air fan (109) is started after a lapse of predetermined time.

8. The refrigerator according to claim 1, further comprising a heater (142) accommodated in said discharge duct (116), a first temperature detector (51) for detecting a temperature within said refrigerator compartment (102), and a second temperature detector (52) for detecting a temperature within said low-temperature storage chamber (133), wherein when a temperature detected by said first temperature detector (51) becomes a set temperature of said refrigerator compartment (102) before a temperature detected by said second temperature detector (52) becomes a set temperature of said low-temperature storage chamber (133), said heater (142) is supplied with electricity.

9. The refrigerator according to claim 1, further comprising a plurality of illumination lamps (141) accommodated in said discharge duct (116), a first temperature detector (51) for detecting a temperature within said refrigerator compartment (102), and a second temperature detector (52) for detecting a temperature within said low-temperature storage chamber (133), wherein when a temperature detected by said first temperature detector (51) becomes a set temperature of said refrigerator compartment (102) before a temperature detected by said second temperature detector (52) becomes a set temperature of said low-temperature storage chamber (133), said plurality of illumination lamps (141) are supplied with electricity.

10. A refrigerator having a refrigerator compartment (163) and a freezer compartment (162); both defined therein, said refrigerator comprising:

a compressor (151), a condenser (152), a first pressure reduction means (113); (153), a channel control valve (156), a first evaporator (154), and a second evaporator (155) connected in series to form a refrigerating cycle (164), said channel control valve (156) being positioned within a refrigerator duct formed in said refrigerator compartment (163), said first and second evaporators (154, 155) being accommodated in said refrigerator compartment (153) and said freezer compartment (162), respectively;

a bypass conduit having a second pressure reduction means (157) for connecting a flow-dividing portion (158) positioned between said first pressure reduction means (153) and said channel control valve (156), and a flow-merging portion (159) positioned between said first evaporator (154) and said second evaporator (155);

a first cold air circulation means (165) accommodated in said refrigerator compartment (163) for circulating an internal air of said refrigerator compartment (163); and a second cold air circulation means (167) accommodated in said freezer compartment (162) for circulating an internal air of said freezer compartment (162), wherein a pressure reduction of said first pressure reduction means (153) is greater than that of said second pressure reduction means (153).

11. The refrigerator according to claim 10, wherein heat is exchanged between a pipe (171) connecting said second evaporator (155) and said compressor (151), and said first pressure reduction means (153).

12. The refrigerator according to claims 10, wherein heat is exchanged between said first pressure reduction means (153) and a pipe (173) connecting said first evaporator (154) and said second evaporator (155).

13. The refrigerator according to claim 10, wherein said freezer compartment (162) is positioned below said refrigerator compartment (163), said first evaporator (154) being disposed above said second evaporator (155) and having a pass pattern in which a plurality of tube runs are sequentially arranged in a single direction from top of said first evaporator (154) downward.

14. The refrigerator according to claim 13, wherein said first evaporator (154) is of a fin-coil-type one disposed near said first cold air circulation means (165) and has a plurality of tube runs, of which neighboring tube runs are shifted from each other by a predetermined pitch (175) to form a staggered layout.

15. The refrigerator according to claim 10, wherein said flow-dividing portion (158), said second pressure reduction means (157), and said flow-merging portion (159) are disposed in said refrigerator compartment (163).

16. A refrigerator having a refrigerator compartment (102; 163), a freezer compartment (162), and a machine chamber (169) all defined therein, said refrigerator compartment (163) being formed above said freezer compartment (162), said machine chamber (169) being formed at a lower portion of said freezer compartment (162), said refrigerator comprising:

a first cold air circulation means (165) and a first evaporator (154) both located on a surface deep inside said refrigerator compartment (163);

a channel control valve (156) positioned within a refrigerator duct formed in said refrigerator compartment (163); and a second cold air circulation means and a second evaporator (155) both located on a surface deep inside said freezer compartment (162), said second evaporator (155) being disposed below said first evaporator (154).

17. The refrigerator according to claim 16, wherein said channel control valve (156) is disposed downstream of said first evaporator (154) with respect to a direction of flow of an internal air of said refrigerator compartment (163).

18. The refrigerator according to claim 16, wherein said channel control valve (156) is disposed adjacent said first cold air circulation means (165).

19. A refrigerator having a refrigerator compartment (163), a freezer compartment (162), and a machine chamber (169) all defined therein, said refrigerator compartment (163) being formed above said freezer compartment (162), said machine chamber (169) being formed at a lower portion of said freezer compartment (162), said refrigerator comprising:

a first cold air circulating means (165) and a first evaporator (154) both located on a surface deep inside said refrigerator compartment (163); and a second cold air circulating means and a second evaporator (155) both located at another lower portion of said freezer compartment (162) in front of said machine chamber (169).

* * * * *